US012660821B2

(12) United States Patent
Jimoh

(10) Patent No.: US 12,660,821 B2
(45) Date of Patent: Jun. 23, 2026

(54) HERBICIDE COMPOSITIONS WITH EPYRIFENACIL AND 2,4-D TRIETHANOLAMINE SALT WITH IMPROVED PROPERTIES

(71) Applicant: MONSANTO TECHNOLOGY LLC, St. Louis, MO (US)

(72) Inventor: Ganiyu A. Jimoh, St. Louis, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 395 days.

(21) Appl. No.: 18/034,447

(22) PCT Filed: Oct. 22, 2021

(86) PCT No.: PCT/US2021/056352
§ 371 (c)(1),
(2) Date: Apr. 28, 2023

(87) PCT Pub. No.: WO2022/098522
PCT Pub. Date: May 12, 2022

(65) Prior Publication Data

US 2023/0389547 A1 Dec. 7, 2023

Related U.S. Application Data

(60) Provisional application No. 63/109,929, filed on Nov. 5, 2020.

(51) Int. Cl.

| | |
|---|---|
| ***A01N 43/54*** | (2006.01) |
| ***A01N 25/22*** | (2006.01) |
| ***A01P 13/02*** | (2006.01) |

(52) U.S. Cl.
CPC ............. *A01N 43/54* (2013.01); *A01N 25/22* (2013.01); *A01P 13/02* (2021.08)

(58) Field of Classification Search
CPC ........ A01N 43/54; A01N 25/22; A01N 39/04; A01P 13/02
See application file for complete search history.

(56) References Cited

U.S. PATENT DOCUMENTS

| | | | |
|---|---|---|---|
| 2,515,198 | A | 7/1950 | Colby et al. |
| 5,550,224 | A | 8/1996 | Hazen |
| 5,874,096 | A | 2/1999 | Hazen |
| 6,391,962 | B2 | 5/2002 | Zerrer et al. |
| 6,713,433 | B2 * | 3/2004 | Jimoh |
| 9,743,664 | B2 | 8/2017 | Hemminghaus et al. |
| 10,624,345 | B2 * | 4/2020 | Pawlak et al. |
| 2010/0261609 | A1 | 10/2010 | Panayi et al. |
| 2018/0258025 | A1 | 9/2018 | Morgenstern |
| 2019/0133116 | A1 | 5/2019 | Liu et al. |
| 2019/0142005 | A1 | 5/2019 | Sada |
| 2019/0142006 | A1 | 5/2019 | Sada |

FOREIGN PATENT DOCUMENTS

| | | | |
|---|---|---|---|
| GB | 697686 | A | 9/1953 |
| WO | WO-2007031438 | A2 | 3/2007 |
| WO | WO-2008069826 | A1 | 6/2008 |
| WO | WO-2011019652 | A2 | 2/2011 |
| WO | WO-2011133482 | A1 | 10/2011 |
| WO | WO-2012064370 | A1 | 5/2012 |
| WO | WO-2012113830 | A1 | 8/2012 |
| WO | WO-2013189773 | A1 | 12/2013 |
| WO | WO-2014007887 | A2 | 1/2014 |
| WO | WO-2017007873 | A1 | 1/2017 |
| WO | WO-2017027250 | A1 | 2/2017 |
| WO | WO2018178039 | * | 10/2018 |
| WO | WO-2019040699 | A1 | 2/2019 |

OTHER PUBLICATIONS

Everson et al. The Effect of 2,4, Dichlorphenoxyacetic Acid on certain Weed and crop seeds. (Year: 1951).*
Ruiter et al. "Influence of adjuvants and formulations on the emission of pesticides to the atmosphere" Plant Research international B.V., Wageningen, Jan. 2003, Report 59. (Year: 2003).*
Adjuvants (Year: 2003).*
Everson et al., "The Effect of 2,4-Dichlorophenoxyacetic Acid on Certain Weed and Crop Seeds", University of Minnesota Agricultural Experiment Station, Technical Bulletin 197, Nov. 1951. (24 pages).
Ruiter et al. "Influence of adjuvants and formulations on the emission of pesticides to the atmosphere", Plant Research International B.V. Wageningen, Jan. 2003. (42 pages).

* cited by examiner

*Primary Examiner* — Robert A Wax
*Assistant Examiner* — Kimberly Barber
(74) *Attorney, Agent, or Firm* — Harness, Dickey & Pierce, P.L.C.

(57) ABSTRACT

The present disclosure relates to the technical field of crop protection. The present disclosure primarily to herbicide compositions comprising as compound (A) ethyl [3-[2-chloro-4-fluoro-5-(1-methyl-6-trifluoromethyl-2,4-dioxo-1,2,3,4-tetrahydropy-qrimidin-3-yl)phenoxy]-2-pyridyloxy] acetate (epyrifenacil) and as compound (B) the triethanolamine salt of 2,4-dichlorophenoxy-acetic acid (2,4-D), in particular to formulations of a certain type and preferably containing further constituents, said compositions and formulations having improved properties. The disclosure also relates to methods of manufacturing such compositions and formulations and the use of such compositions and formulations.

27 Claims, No Drawings

HERBICIDE COMPOSITIONS WITH EPYRIFENACIL AND 2,4-D TRIETHANOLAMINE SALT WITH IMPROVED PROPERTIES

CROSS-REFERENCE TO RELATED APPLICATION

This application is a U.S. national stage filing under 35 U.S.C. § 371 of International Application No. PCT/US2021/056352, filed on Oct. 22 2021, which claims the benefit of and priority to U.S. Provisional Application Ser. No. 63/109,929, filed Nov. 5, 2020. The entire disclosures of each of the above applications are incorporated herein by reference.

FIELD

The present disclosure relates to the technical field of crop protection. The present disclosure primarily relates to herbicide compositions comprising as compound (A) ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (epyrifenacil) and as compound (B) the triethanolamine salt of 2,4-dichlorophenoxyacetic acid (2,4-D), in particular to formulations of a certain type and preferably containing further constituents, said compositions and formulations having improved properties. The disclosure also relates to methods of manufacturing such compositions and formulations and the use of such compositions and formulations.

BACKGROUND

This section provides background information related to the present disclosure which is not necessarily prior art.

Crop protectant compositions can be formulated in many different ways, with the possibility of the characteristics of the active ingredients and the nature of the formulation giving rise to problems in terms of chemical stability of the active ingredients therein, physical and storage stability of the formulation, efficacy, and applicability of the formulations. Moreover, certain formulations are more advantageous on economic and environmental grounds than others.

Water-based formulations generally have the advantage that they require a low fraction of organic solvents, or none at all. On the other hand, the distribution of the constituents in such formulations is often inadequate unless appropriate combinations of auxiliaries are used. The performance properties of such formulations frequently depend on a large number of variable parameters, making it impossible simply to select components of known systems and to combine them with the active ingredients intended for new formulation, if the resultant formulation is to be biologically active, stable on storage, and ideal from the applications standpoint.

Standard formulations, therefore, are rarely suitable for meeting particular requirements, and it can require a great deal of experimental work to develop an appropriate formulation. Many herbicidal formulations containing water-soluble active crop protectant ingredients have been described. Also, liquid concentrate formulations of two herbicidal active ingredients, one of which is water-soluble and the other of which is oil-soluble, are known in the alt WO 2011/019652 concerns low volatility auxin herbicide formulations comprising an auxin herbicide component consisting essentially of an auxin herbicide salt and comprising a certain minimum amount of dicamba monoethanolamine salt.

U.S. Pat. No. 6,713,433 teaches liquid concentrate herbicidal emulsion compositions comprising a water-soluble herbicide, an oil-soluble herbicide, a stabilizing amount of water-soluble chlorides, and one or more surfactants.

WO 2017/007873 relates to methods for controlling volunteer glyphosate-resistant corn by applying synergistic mixtures of e.g. [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (epyrifenacil) and glyphosate or a salt thereof.

WO 2019/040699 discloses to agricultural mixtures of certain PPO (protoporphyrinogen oxidase) herbicides, including epyrifenacil, and a C16 to C18 fatty acid methyl ester adjuvant system.

US 2019/0142005 concerns herbicidal compositions based on ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (epyrifenacil) in combination with the diglycolamine (DGA) salt of dicamba and/or the N,N-bis-(3-aminopropyl)methylamine (BAPMA) salt of dicamba.

US 2019/0142006 relates to herbicidal compositions comprising ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate (epyrifenacil) and 2,4-D choline salt.

WO 2012/113830 teaches the use of choline chloride in agrochemical formulations as a bio-activator to increase the penetration of agrochemical active ingredients in a plant.

WO 2011/133482 discloses a method of improving the solubility in water of ammonium salts of auxinic herbicides which comprises using the N,N,N-trimethylethanolammonium cation as the ammonium salt of the auxinic herbicide.

WO 2017/027250 teaches certain agricultural compositions comprising a pesticide and a non-pesticide choline salt as water conditioning component.

U.S. Pat. No. 2,515,198 suggests certain aqueous herbicidal spray compositions comprising an alkanolamine salt of a chlorophenoxyacetic acid and a water-soluble methyl cellulose.

GB 697,686 mentions that tri-basic amine citrates were found to be effective to prevent precipitation when concentrated polychlorophenoxyacetic acid amine salt formulations are admixed with hard water for use in the field.

WO 2008/069826 generally relates to a method for minimizing the formation of insoluble salts of phenoxy herbicides. The method comprises mixing a compatibility agent, amine salts of phenoxy acid herbicides, and a chemical containing non-amine cations in an aqueous system to form a stable and non-nozzle plugging solution.

US 2010/0261609 concerns certain phenoxy alkanoate herbicide compositions containing a phenoxyalkanoate amine salt wherein the amine is a substituted amine and the total amount of substituted amine is at least a 20% molar excess based on the number of moles of phenoxyalkanoate.

WO 2014/007887 discloses certain aqueous herbicidal spray mixtures comprising certain aromatic esters (for controlling agricultural spray drift), water soluble salts of certain auxinic herbicides and glyphosate or a salt thereof.

SUMMARY

This section provides a general summary of the disclosure, and is not a comprehensive disclosure of its full scope or all of its features.

Among the several features of the present disclosure, it may be noted that the herbicidal compositions of the present disclosure are useful in agriculture wherein at least two herbicidal active ingredients, one of which is a water-soluble herbicide (compound (B)) and the other of which is an oil-soluble herbicide (compound (A)) are coformulated; these compositions exhibit rapid burndown and early visual symptomology; allow for higher loading of herbicidal active ingredients; have prolonged storage stability and are easy to use.

Thus, it has been found that herbicide compositions comprising compounds (A) and (B), wherein (A) denotes ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (epyrifenacil) and (B) denotes the triethanolamine (TEA) salt of 2,4-D (2,4-dichlorophenoxyacetic acid), can exhibit improved properties, in particular in terms of chemical stability of the active ingredients therein, physical and storage stability of the formulation, herbicidal efficacy, and/or applicability of corresponding formulations. More specifically, the herbicide compositions according to the present disclosure exhibit substantially no crystallization or phase separation when stored at a temperature of from about −20° C. to about 40° C. for a period of several weeks.

Further, the herbicide compositions according to the present disclosure preferably are in the form of an oil-in-water emulsion, more preferably in the form of an oil-in-water microemulsion, in particular with droplets having a certain average droplet size.

Still further, in the herbicide compositions according to the present disclosure the ratio by weight of the total amount of compound (A) and the total amount of compound (B) is in the range of from about 1:10 to about 1:150.

Still further, the herbicide compositions according to the present disclosure preferably additionally comprise one or more further constituents selected from the group consisting of herbicidal active compounds (i.e. herbicides different from compounds (A) and (B)), herbicide safeners, formulation auxiliaries and additives customary in crop protection.

Still further, the herbicide compositions according to the present disclosure preferably comprise a substantially water-immiscible organic solvent.

Still further, the herbicide compositions according to the present disclosure preferably comprise one or more water-soluble stabilizing agents, preferably one or more water-soluble organic stabilizing agents.

The herbicide compositions according to the present disclosure preferably comprise one or more drift retardant agents.

The herbicide compositions according to the present disclosure advantageously have an acidic pH-value.

The present disclosure also relates to a method for controlling undesired plant growth which comprises applying herbicide compositions according to the present disclosure onto the plants, parts of plants, plant seeds or the area where the plants grow.

Further areas of applicability will become apparent from the description provided herein. The description and specific examples in this summary are intended for purposes of illustration only and are not intended to limit the scope of the present disclosure.

DETAILED DESCRIPTION

Example embodiments will now be described more fully. The description and specific examples included herein are intended for purposes of illustration only and are not intended to limit the scope of the present disclosure.

The disclosure primarily relates to (preferably liquid) herbicide compositions comprising compounds (A) and (B), wherein: (A) denotes ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate acetate (epyrifenacil); and (B) denotes the triethanolamine (TEA) salt of 2,4-D (2,4-dichlorophenoxyacetic acid).

Compound (A) of an herbicide composition according to the present disclosure can be represented by the following formula (A):

formula (A)

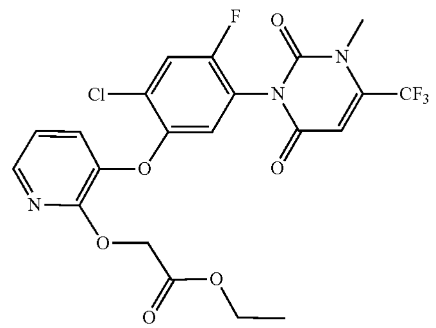

Compound (B) of an herbicide composition according to the present disclosure is the triethanolamine salt of 2,4-dichlorophenoxyacetic acid (2,4-D) (herein also referred to as "TEA salt of 2,4-D") which can be represented by the following formula (B):

formula (B)

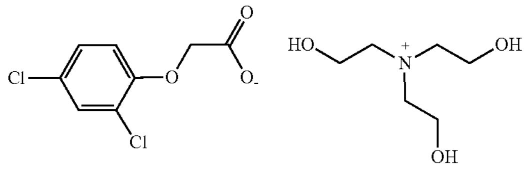

Compound (B) in herbicide compositions of the present disclosure as such is known from the prior art. The triethanolamine salt of 2,4-dichlorophenoxyacetic acid (2,4-D) is readily obtainable in water by neutralization of 2,4-D with triethanolamine (other names for triethanolamine are 2,2',2''-nitrilotri(ethan-1-ol), tris(2-hydroxyethyl)amine, 2,2',2''-trihydroxytriethylamine, trolamine, of abbreviated as TEOA or TEA). In the context of the present disclosure compound (B) may be used in pure form or as aqueous solution for the preparation of an herbicide composition according to the present disclosure.

Compound (B) of an herbicide composition according to the present disclosure, i.e. the triethanolamine (TEA) salt of 2,4-D, has the advantage that it has good water solubility allowing the preparation of higher loaded formulations and has improved compatibility with potassium glyphosate formulations. Compound (B) has increased compatibility that when it is used at normal tank mix concentrations precipitation is not seen, thereby e.g. avoiding precipitations that can occur when typical 2,4-D formulations are mixed with potassium glyphosate.

In particular, the TEA salt of 2,4-D is a low volatility salt. Thus, by incorporating the TEA salt of 2,4-D into the herbicide composition of the present disclosure, a volatility control agent is not necessary, and the herbicide composition of the present disclosure can be free of volatility control agents and also can be used without the addition volatility control agents.

Further, the TEA salt of 2,4-D allows high formulation flexibility in an herbicide composition according to the present disclosure, high loading of 2,4-D (calculated as acid equivalent, a.e.), and improved formulation stability and compatibility.

Generally and preferably, the compositions according to the present disclosure are liquid at 25° C. and 1013 mbar.

The herbicide compositions according to the present disclosure are preferably liquid herbicide concentrates, preferably in the form of oil-in-water type emulsions, and more particularly preferably are liquid herbicide concentrates in the form of microemulsions.

Oil-in-water type emulsions have a discontinuous oil phase dispersed in a continuous aqueous phase, typically with the aid of one or more emulsifying agents. The water-soluble active ingredient is contained predominantly in the aqueous phase and the oil-soluble active ingredient is contained predominantly in the oil phase.

The individual oil particles can be large enough to interfere with the transmission of light, giving rise to a cloudy or milky emulsion known as a macroemulsion. However, where the individual oil particles are so small as to allow light to be transmitted without noticeable scattering, the emulsion is clear, i.e. transparent, and is known as a microemulsion. Microemulsions offer several practical advantages, one of the most important being that they are thermodynamically stable and typically remain homogeneous without agitation for long periods of time. In this respect, a microemulsion formulation can be handled by an agricultural technician or other user with the same ease and convenience as a simple aqueous solution.

However, selecting excipient ingredients for the preparation of a microemulsion is not necessarily straightforward or easy.

Difficulties in preparing stable microemulsions suitable for effective weed control and good crop safety are compounded when the active ingredients to be formulated are a water-soluble herbicide and an oil-soluble herbicide. For example, one challenge is that water-mediated chemical degradation, e.g., hydrolysis, of the oil-soluble herbicide must be minimized. Minimizing hydrolysis is especially difficult in microemulsions, where the oil particles containing the oil-soluble herbicidal active are extremely small and therefore present a very large interfacial area with the aqueous phase.

Another challenge is that microemulsions must contain surfactant(s) with or without co-surfactant(s), which tend to facilitate transfer of the oil-soluble herbicidal active across the large interface between the oil and aqueous phases, increasing the potential for chemical degradation. However, surfactants are important to the microemulsion composition, functioning as emulsifying agents to physically stabilize the microemulsion, as dispersants to prevent aggregation of oil particles when the microemulsion is diluted in water for application to plants, and as adjuvants to enhance herbicidal efficacy of one or both active ingredients, for example by improving retention on or adhesion to foliar surfaces of the applied composition or by improving penetration of the active ingredient(s) into or through the cuticles of the plant foliage.

To optimize the chemical and/or physical stability of the herbicide compositions according to the present disclosure, in particular as liquid herbicide concentrates in the form of microemulsions, several parameters were investigated and found to be important. The type and choice of the organic solvent(s), dispersant(s), stabilizing agent(s) used as well as the pH-value have effects on the chemical and/or physical stability of the herbicide compositions according to the present disclosure.

In the field of agriculture, weed control using herbicides is a key element of agronomic systems for delivering profitable crop yield. Continued investigations for (the use of) new herbicidal active ingredients (herbicides) over the years have led to the need to develop formulations (compositions) containing herbicides with different modes of action, e.g. for managing weed resistance. This disclosure provides for physically and chemically stable compositions containing ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate (compound (A)) in the presence of the triethanolamine salt of 2,4-D (compound (B)), and optionally one or more further water-soluble herbicides, at high ionic strength. The formulations according to the present disclosure are preferably microemulsions which may also include a drift retardant agent for further managing off-target movement of compound (B), and optionally other herbicides optionally in a formulation of the present disclosure, making the development of said formulations more challenging. The formulations according to the present disclosure preferably separate the oil-soluble compound (A) from the water-soluble herbicide(s) comprising or consisting of compound (B), thereby minimizing chemical degradation of compound (A). A dispersant system comprising one or more surfactants is preferably used to stabilize the formulations of the present disclosure, preferably comprising or consisting of nonionic, cationic and/or anionic surfactants. Our own experiments have shown that certain phosphate esters are particularly suitable surfactants used as dispersants in the formulations of the present disclosure. It was further found that through pH control, selection of an appropriate organic solvent and inclusion of a water-soluble stabilizing agent (preferably one or more organic quaternary ammonium chlorides), chemical stabilities as high as 100% for the water-soluble herbicides and up to 98% for the oil-soluble compound (A) are achievable under 54° C., 2 week accelerated aging storage conditions.

These compositions exhibited physical stability when stored at 54° C. for 2 weeks, at 40° C. for 8 weeks and at −20° C. for several weeks. Despite the chemical instability of compound (A) in solution, formulations have been developed which allow up to 100% recovery of the 2,4-dichlorophenoxyacetic acid and recoveries up to 98% for compound (A) after 54° C., 2 week storage, depending on pH-value, type and amount of organic solvent, and the inclusion of water-soluble stabilizing agents. Compositions according to the present disclosure tested in the green house have shown excellent weed control, and with good drift and/or volatility performance, in particular if a drift retardant agent is incorporated into the herbicide compositions of the present disclosure.

In the context of the present disclosure, compositions were developed in the form of physically and chemically stable microemulsions containing multiple herbicides with different Modes of Action (MOAs), including oil-soluble compound (A) and the water-soluble triethanolamine salt of 2,4-D, both alone and in combination with (salts of) other herbicides. Application of such compositions can further help with weed resistance management.

The herbicide compositions according to the present disclosure preferably are in the form of an oil-in-water emulsion, more preferably in the form of an oil-in-water microemulsion, in particular with droplets having a certain average droplet size.

Preferably, an herbicide composition according to the present disclosure is a liquid herbicidal concentrate having a continuous aqueous phase and a discontinuous oil phase, the composition comprising: (a) compound (A) in said discontinuous oil phase; (b) compound (B) in said aqueous phase, preferably in the form of a microemulsion, wherein compounds (A) and (B) are present in a total concentration that is biologically effective when the composition is diluted in a suitable volume of water and applied to the foliage of a susceptible plant.

The herbicide compositions according to the present disclosure preferably are in the form of an oil-in-water microemulsion, preferably with an average oil droplet size smaller than 100 nm, more preferably with an average oil droplet size in the range of about 1 nm to about nm, in each case when measured at 25° C. and 1013 mbar. The measurements were made with a Malvern Zetasizer Nano-ZS model ZEN 3600 at 25° C. and 1013 mbar.

With this formulation type, in particular in the preferred embodiments described herein, chemical degradation of compound (A) is significantly reduced (i.e. can be largely avoided) and improved/prolonged formulation (storage) stability is achieved.

In the herbicide compositions according to the present disclosure the ratio by weight of the total amount of compound (A) and the total amount of compound (B) is in the range of from about 1:1 to about 1:150, preferably in the range from about 1:20 to about 1:125, more preferably in the range of about 1:20 to about 1:100, and particularly preferably in the range of about 1:20 to about 1:80 or in the range of about 1:20 to about 1:60.

Preferably, the herbicide compositions according to the present disclosure comprise compound (B) in a total amount of up to about 75 wt.-%, preferably in a total amount in the range from about 5 wt.-% to about 70 wt.-%, more preferably in a total amount in the range from about 5 wt.-% to about 65 wt.-%, and particularly preferably in a total amount in the range from about 10 wt.-% to about 60 wt.-%, in each based on the total weight of the herbicide composition; and/or compound (A) in a total amount of up to about 2 wt.-%, preferably in a total amount in the range from about 0.2 wt.-% to about 1.5 wt.-%, more preferably in a total amount in the range from about 0.25 wt.-% to about 1.25 wt.-%, and particularly preferably in a total amount in the range from about 0.4 wt.-% to about 1.0 wt.-%, in each based on the total weight of the herbicide composition.

Preferably, the herbicide compositions according to the present disclosure comprise compound (B) in a total amount of up to about 65 wt.-%, preferably in a total amount in the range from about 10 wt.-% to about 65 wt.-%, more preferably in a total amount in the range from about 15 wt.-% to about 60 wt.-%, and particularly preferably in a total amount in the range from about 15 wt.-% to about 55 wt.-%, in each based on the total weight of the herbicide composition.

Preferably, an herbicide composition according to the present disclosure additionally comprises one or more further constituents selected from the group consisting of further herbicidal active compounds (i.e. herbicides different from compounds (A) and (B)), herbicide safeners, formulation auxiliaries and additives customary in crop protection.

The herbicide compositions according to the present disclosure may comprise one or more further herbicidal active crop protectant ingredients (in addition to compound (A) and compound (B) as defined in the context of the present disclosure) and/or herbicide safeners.

These, preferably water-soluble, other herbicides (herbicidal actives, herbicidal active crop protectant ingredients herbicides) and/or herbicide safeners optionally present in compositions according to the present disclosures and the common names used herein are commonly known; see, for example, "The Pesticide Manual" 16th Edition, British Crop Protection Council 2012; these include the known stereoisomers (in particular racemic and enantiomeric pure isomers) and derivatives such as salts or esters, and particularly the commercially customary forms.

The herbicide compositions according to the present disclosure may comprise one or more further water-soluble active crop protectant ingredients in addition to compound (B) as defined in the context of the present disclosure.

Further water-soluble herbicides suitable for use in compositions of the disclosure include asulam, benazolin, bentazon, bialaphos, bromacil, bromoxynil, chloramben, clopyralid, dicamba, dichlorprop, difenzoquat, diquat, fenoxaprop, flamprop, fluoroglycofen, flupropanate, glufosinate, glyphosate, imazamethabenz, imazamox, imazapic, imazapyr, imazaquin, imazethapyr, ioxynil, MCPA, MCPB, mecoprop, picloram, quinclorac, sulfamic acid, 2,3,6-TBA, TCA, triclopyr and water-soluble salts thereof.

A preferred group of water-soluble herbicides are salts of phenoxy herbicides (such as dicamba, dichlorprop, MCPA, MCPB, mecoprop, picloram and triclopyr), salts of imidazolinone herbicides, salts of glufosinate and salts of glyphosate.

If the herbicide compositions according to the present disclosure comprise one or more further water-soluble active crop protectant ingredients in addition to compound (B), the water-soluble active crop protectant ingredients are more preferably selected from the group consisting of glufosinate [2-amino-4-[hydroxy(methyl)phosphinoyl]butanoic acid] and salts thereof and glyphosate [N-(phosphonomethyl) glycine] and salts thereof.

To allow a high concentration of one or more water-soluble herbicidal active crop protectant ingredients in the herbicide compositions according to the present disclosure, the water-soluble herbicidal active crop protectant ingredients are preferably used in form of their salts since these generally speaking show higher water solubility.

In addition to compound (A) and compound (B), the herbicide compositions according to the present disclosure may contain one or more further water-soluble active crop protectant ingredients selected from the group consisting of glufosinate-ammonium, glufosinate-sodium, L-glufosinate-ammonium, L-glufosinate-sodium, glyphosate-diammonium, glyphosate-dimethylammonium, glyphosate-isopropylammonium, glyphosate-monoammonium, glyphosate-potassium, glyphosate-dipotassium, glyphosate-sesquisodium (N-(phosphonomethyl)glycine sodium salt (2:3)), glyphosate-trimesium, the triethanolamine salt of glyphosate, the monoethanolamine salt of glyphosate.

If the herbicide compositions according to the present disclosure comprise one or more further water-soluble active crop protectant ingredients in addition to compound (B), said further herbicidal active compound is preferably selected from the group consisting of glyphosate and salts thereof, preferably selected from organic glyphosate salts, in particular the glyphosate salts mentioned herein in the context of the present disclosure.

If the herbicide compositions according to the present disclosure comprise one or more further water-soluble active crop protectant ingredients in addition to compound (B), said further water-soluble active crop protectant ingredients are preferably selected from group of the water-soluble active crop protectant ingredients mentioned above, preferably from the group of preferred or particularly preferably further water-soluble active crop protectant ingredients mentioned above, wherein the total amounts of said further water-soluble active crop protectant ingredients and of compound (B) is up to about 70 wt.-%, preferably in a in the range from about 10 wt.-% to about 65 wt.-%, more preferably in a total amount in the range from about 15 wt.-% to about 60 wt.-%, and particularly preferably in a total amount in the range from about 15 wt.-% to about 55 wt.-%, in each based on the total weight of the herbicide composition.

In some embodiments, in the herbicide compositions according to the present disclosure, preferably in one of the preferred, more preferred, particularly preferred embodiments or most preferred embodiments defined herein, including the embodiments defined as M1 to M288 hereinafter, the only herbicidal active ingredients in said herbicide compositions are compound (A) and compound (B).

In some embodiments, in the herbicide compositions according to the present disclosure, preferably in one of the preferred, more preferred, particularly preferred embodiments or most preferred embodiments defined herein, including the embodiments defined as M1 to M288 hereinafter, the only herbicidal active ingredients in said herbicide compositions are compound (A) and compound (B), and optionally a glyphosate salt. If a glyphosate salt is present, preferably an organic glyphosate salt, more preferably the triethanolamine salt of glyphosate, is present in said herbicide compositions. Preferably, an herbicide composition according to the present disclosure comprises at least one dispersant present in a concentration sufficient to provide acceptable physical stability of the composition, in particular if the composition is in form of a microemulsion.

The herbicidal compositions of the present disclosure may optionally comprise one or more dispersants (anionic, cationic or zwitterionic and/or nonionic surface-active compounds (surfactants)) which are able to contribute to improved stability, in particular of compound (A), as well as further improved plant availability and/or further improved activity of the herbicidal active crop protectant ingredients present in the herbicidal compositions of the present disclosure.

Such dispersants may be selected, e. g. from the group of ionic polymers, like sodium naphthalene sulphonate formaldehyde condensates or Kraft-lignosulfonate sodium salt, like Morwet D245 (Akzo Nobel) or Kraftsperse 25M (Ingevity), or from the group of non-ionic polymers, like polyethoxylated polymethacrylates, like Atlox 4913 (Croda). Such dispersants may also be selected e. g. from the group of ionic surfactants, like dialkyl naphthalene sulfate sodium, like Oparyl MT800 (Bozetto), or non-ionic surfactants, like Tristyryl phenol alkoxylates, like Soprophor 796/P (Solvay) or block-co-polymers of ethylene/propylene oxides, like Pluronic PE 6800 (BASF). Also, $C_{12}$-$C_{14}$ fatty alcohol diethylene glycol ether sulfate sodium-, potassium-, ammonium-salts or $C_{12}$-$C_{14}$ alkyl amine ethoxylates with 4 to 8 ethylene oxide (EO) units can be used.

Preferably, an herbicide composition according to the present disclosure comprises at least one dispersant. In an herbicide composition according to the present disclosure dispersants of cationic, anionic and nonionic types may be used. However, preference is given to one or more dispersants selected from the group consisting of phosphate esters and alkylpolyglucosides (APG).

From the group of phosphate esters, preference is given to ethoxylated phosphate esters, more preferred are phosphate esters with an average of 3 to 5 ethylene oxide (EO) units. Such preferred phosphate esters are for example available from Croda under the trade names Crodafos O3A (with an average of 3 ethylene oxide (EO) units) or Crodafos O5A (with an average of 3 ethylene oxide (EO) units). Crodafos O5A contains Ethoxy Oleyl Alcohol Acid Phosphate CAS #39464-69-2, Phosphoric Acid CAS #7664-38-2 and water. Such phosphate esters are also known under the INCI-name "Oleth-5 Phosphate", a complex ester of phosphoric acid and ethoxylated cosmetic grade oleyl alcohol. Crodafos O3A is similar to Crodafos O5A except that it contains 3 EO units instead of 5 EO units which means that Crodafos O3A is more hydrophobic than Crodafos O5A.

In a preferred embodiment, in particular if the herbicide composition according to the present disclosure comprises one or more glyphosate salts, the dispersants comprise or consist of alkylpolyglucosides.

Said alkylpolyglucosides are preferably $C_6$-$C_{16}$ alkylpolyglucosides, more preferably $C_8$-$C_{12}$ alkylpolyglucosides. Preferably, said alkylpolyglucosides are $C_8$-$C_{12}$ alkylpolyglucosides with a degree of polymerization of less than 5 and in some case $C_8$-$C_{10}$ alkylpolyglucosides with a degree of polymerization of less than 2.

Such $C_6$-$C_{16}$ alkylpolyglucosides, are known in the art and commercially available, e.g. alkylpolysaccharides and mixtures thereof such as those, for example, alkylpolyglycosides in the form of the Agnique PG® grades from BASF, an example being ®Agnique PG 8107 (fatty alcohol $C_8$-$C_{10}$ glucosides), ®Agnique PG 9116 (fatty alcohol $C_9$-$C_{11}$ glucosides), alkylpolyglycoside/alkylpolysaccharide mixtures based on $C_8$-$C_{10}$ fatty alcohol such as Glucopon 225 DK and ®Glucopon 215 CSUP (BASF).

In a preferred embodiment, in particular if the herbicide composition according to the present disclosure comprises one or more glyphosate salts, the dispersants comprise or consist of alkylpolyglucosides. In an herbicidal composition according to the present disclosure containing a glyphosate-salt in addition to compounds (A) and (B), the ratio by weight of the total amount of glyphosate calculated as free acid (i.e. calculated as acid equivalent) to the total amount of alkylpolyglucosides is in the range of about 8:1 to 1:2, preferably in the range of about 5:1 to 1:1, more preferably in the range of about 4:1 to 3:2, in each case based on the total weight of the composition.

The herbicide compositions according to the present disclosure preferably comprise a substantially water-immiscible organic solvent, wherein the organic solvent is preferably selected such that compound (A) has an organic solvent/water partition coefficient, expressed as a logarithm, of about 4 or greater, preferably of about 5 or greater, more preferably of about 6 or greater, even more preferably of about 8 or greater, in each case when measured at and 1013 mbar. A method to determine the organic solvent/water partition coefficient for compound (A) in a solvent is given in the Examples section herein below.

Generally, organic solvents having a higher solubility of the oil-soluble herbicide therein are more suitable, provided the organic solvent is substantially immiscible with water.

Preferably, the herbicide compositions according to the present disclosure comprise one or more organic solvents, wherein (i) at least one of said organic solvents is not fully miscible with water and wherein (ii) compound (A) has a solubility of 5 wt.-% or greater, preferably of 10 wt.-% or greater, in at least one of said organic solvents, in each case when measured at 25° C. and 1013 mbar.

Full miscibility ("fully miscible") in the context of the present disclosure is the property of two substances to mix in all proportions (that is, to fully dissolve in each other at any concentration or ratio), forming a homogeneous solution, in each case when measured at 25° C. and 1013 mbar.

Particularly preferably an herbicide composition according to the present disclosure comprises one or more organic solvents selected from the group consisting of ketones and esters, in particular acetates, that are not fully miscible with water and aromatic hydrocarbons. Preference in turn is given to acetophenone, cyclohexanone or 4-methyl-2-pentanone, benzyl acetate and aromatic hydrocarbons $C_{10}$-$C_{16.}$ Particularly preferred organic solvents are selected from the group consisting of acetophenone, benzyl acetate and (mixtures) of aromatic hydrocarbons $C_{10}$-$C_{16}$ (like Aromatic 200 ND). The most preferred organic solvents in the context of the present disclosure are acetophenone and benzyl acetate as they have superior solvent properties for compound (A) and lead to even higher physical stability of formulations, in particular microemulsions, according to the present disclosure as well as superior chemical stability of compound (A) in the formulations, in particular microemulsions, according to the present disclosure.

Aromatic 200 ND is Solvent Naphtha (petroleum), Heavy Aromatic, a complex mixture of aromatic hydrocarbons, the main components thereof (typically about 50-85 wt.-%) are aromatic hydrocarbons ($C_{11}$-$C_{14}$) including 1-methylnaphthalene and 2-methylnaphthalene, as well as aromatic hydrocarbons ($C_{10}$), including naphthalene, and aromatic hydrocarbons ($C_{15}$-$C_{16}$), the total amount of aromatic hydrocarbons being >99 wt.-%.

If aromatic hydrocarbons such as mixtures of aromatic hydrocarbons $C_{10}$-$C_{16}$) (like Aromatic 200 ND) are used as organic solvents in the context of the present disclosure, it is highly beneficial to also use phosphoric acid (e.g. in the form of phosphoric acid 85% in water) in herbicide compositions, in particular in the form of microemulsions, according to the present disclosure.

In contrast, largely water-miscible organic solvents or fully water-miscible organic solvents, like for example acetone, acetonitrile, dioxane, ethanol and methanol, propylene glycol or propylene carbonate—although having good to excellent solvent properties for compound (A)—are not suitable as the sole or the main organic solvent in the context of the present disclosure.

In some cases, it may be advantageous to include one or more further organic solvents in addition to the preferred organic solvents mentioned above. Such further organic solvents can for example be propylene glycol or decanol.

Generally, the ratio by weight of the total amount of the substantially water-immiscible organic solvent(s), preferably selected such that compound (A) has an organic solvent(s)/water partition coefficient, expressed as a logarithm, of about 4 or greater, preferably of about 5 or greater, more preferably of about 6 or greater, even more preferably of about 8 or greater, in each case when measured at 25° C. and 1013 mbar, to the total amount of compound (A) in herbicide composition according to the present disclosure is greater than about 1:1, preferably greater than about 2:1, more preferably greater than about 3:1.

In the herbicide composition according to the present disclosure, the total amount of the water-immiscible organic solvent is in the range of about 2 wt.-% to about 30 wt.-%, preferably in the range of about 5 wt.-% to about 25 wt.-%, more preferably in the range of about 8 wt.-% to about 20 wt.-%, in each case based on the total weight of the composition.

A higher amount of organic solvent(s) generally results in a better, i.e. higher or further improved, stability of the herbicide compositions according to the present disclosure. Therefore, preferably, said ratio by weight of total amount of the substantially water-immiscible organic solvents to the total amount of compound (A) in herbicide composition according to the present disclosure is in the range of from about 4:1 to 40:1, more preferably in the range of from about 6:1 to 30:1, and particularly preferably in the range of from about 8:1 to 25:1.

The herbicide compositions according to the present disclosure preferably comprise one or more water-soluble stabilizing agents, preferably one or more water-soluble organic stabilizing agents. It was found that for example inorganic chlorides such as NaCl can be used as stabilizers for compound (A) in herbicide compositions, However, the amounts or concentrations of chloride ions from inorganic chlorides such as NaCl that are necessary to stabilize compound (A) in herbicide compositions have shown to be incompatible 2,4-D and its salts, such as precipitation of 2,4-D acid due to displacement reaction and saturation.

It now has further been found that certain water-soluble organic compounds are able to stabilize compound (A) in the herbicide composition of the present disclosure. More specifically, the herbicide compositions according to the present disclosure preferably comprise one or more water-soluble organic halides as stabilizing agents, in turn preferably selected from the group of organic quaternary ammonium halides and chlorine containing vitamins (chlorinated vitamins), and mixtures thereof.

More preferably, the herbicide compositions according to the present disclosure comprise one or more water-soluble organic stabilizing agents selected from the group of organic quaternary ammonium chlorides.

More specifically, the herbicide compositions according to the present disclosure preferably comprise one or more water-soluble organic stabilizing agents selected from the group consisting of vitamin B4 (choline chloride; (2-hydroxyethyl)trimethylammonium chloride; CAS number 67-48-1), vitamin B6 (pyridoxine hydrochloride; 4,5-bis (hydroxymethyl)-3-hydroxy-2-methylpyridine hydrochloride; 3-Hydroxy-4,5-bis(hydroxymethyl)-2-methylpyridine hydrochloride; CAS number 58-56-0), benzalkonium chloride (N-alkyl-N-benzyl-N,N-dimethylammonium chloride; alkyldimethylbenzylammonium chloride; CAS number 8001-54-5), and mixtures thereof.

In the context of the present disclosure, vitamin B4 (choline chloride) is the preferred stabilizing agent due to its significantly higher solubility in water and higher chloride content compared to vitamin B6 and benzalkonium chloride.

The herbicide compositions according to the present disclosure preferably comprise one or more water-soluble stabilizing agents in a total amount of from about 1% to about 20% by weight, preferably from about 2% to about 17% by weight, more preferably from about 4% to about 16% by weight, in each case based on the total weight of the composition.

The herbicide compositions according to the present disclosure preferably have an acidic pH-value, i.e. a pH-value of less than 7. More specifically, the pH-value of the diluted herbicide compositions according to the present disclosure is in the range of about 4.0 to about 6.0, preferably in the range of about 4.5 to about 5.5, more preferably in the range of about 4.6 to about 5.3, in each case when diluted with water such that the concentration of the triethanolamine salt of 2,4-D corresponds to 1.8% by weight calculated 2,4-D acid (i.e. 1.8% by weight acid equivalent) and measured at 25° C. and 1013 mbar.

The pH-value of the diluted composition obtained by dilution of an herbicide composition according to the present disclosure was measured using conventional pH measuring equipment, preferably by immersing the probe of a pH meter into a sample of the diluted composition. Prior to measuring pH of the diluted composition, the pH meter was calibrated in accordance with the manufacturer's recommended protocol.

The herbicide compositions according to the present disclosure preferably comprise a drift retardant agent (DRA), preferably one or more fatty oils, typically in a total amount in the range of about 1 wt.-% to about 10 wt.-%, preferably in the range of about 2 wt.-% to about 8 wt.-%, more preferably in the range of about 3 wt.-% to about 7 wt.-%, and particularly preferably in the range of about 4 wt.-% to about 6 wt.-%, in each case based on the total weight of the composition.

Off-site movement is a known characteristic to be managed with spray solutions containing auxin herbicides such as dicamba or 2,4-D. To help control drift, drift retardant agents (DRAs) (also known as drift reduction agents or drift control agents) can be included in the herbicidal compositions according to the present disclosure. DRAs for herbicidal sprays can work by modifying the size distribution of particles formed by the nozzle, for example, by partially suppressing the formation of the smallest particles, also known as driftable fines, which settle slowest and are most prone to drift with the wind. Definitions of the size limit of "driftable fines" vary, but particles with a diameter below 150 μm are typically considered susceptible to drift.

U.S. Pat. Nos. 5,550,224, 5,874,096, 6,391,962, WO 2007/031438 and WO 2012/064370 each disclose agricultural compositions with drift control agents based on certain polymers, e.g. guar (derivatives) or certain other polymers. WO 2013/189773 relates to aqueous composition comprising dicamba and certain drift control agents. US 2019/0133116A1 discloses pesticide compositions comprising an auxin herbicide and a built-in fatty acid-based drift control agent.

There are typically two types of DRAs. The first type of DRA is polymers, which can increase the extensional viscosity of the spray mixture. These polymers, limited in commercial practice to polyacrylamides, polyethylene oxide, and guar gum, can shift the spray particle size distribution to larger diameters. While such polymers can be effective in reducing driftable fines for some nozzles, for example, the Turbo Teejet® Induction (TTITM) nozzle from TeeJet and the HYPRO® Ultra Lo-Drift (ULD) nozzle, they can be less preferred because they can result in significantly coarser spray, which can provide poorer coverage, compromising weed control. Furthermore, such polymers, if incorporated into an herbicidal formulation, can generally result in unacceptably high viscosity.

The second type of DRA is known as "oil-type" or "emulsion-type" DRAs. As the name suggests, an oil-type DRA, largely immiscible with water, can be included in a tank formulation as an emulsion or micro-emulsion. Drift retardants of this type are available commercially as additives to a spray tank under brand names, such as Border EG (Precision Labs) and InterLock® (Winfield). These oil-type or emulsion-type DRAs can be effective at the suppression of driftable fines, work well in a wide variety of nozzles, and can have less effect on the average particle size of the spray; thus, providing better application coverage and herbicidal efficacy.

While the use of oil-type or emulsion-type DRAs as a tank additive is common and straightforward, incorporation into an herbicidal formulation remains technically challenging, particularly for auxin herbicidal formulations with a high load of auxin herbicide, such as dicamba and 2,4-D, which are typically formulated as salts in concentrated aqueous solution.

Preferred fatty oils and (methyl) esters of fatty oils advantageously used as DRAs a part of an herbicide composition of the present disclosure are triglycerides of fatty acids with 12 to 24 carbon atoms or esters of fatty oils, preferably methyl esters of fatty oils, and are preferably selected from the group consisting soybean oil, an ester of soybean oil, canola oil, an ester of canola oil, palm oil, an ester of palm oil, rapeseed oil, an ester of rapeseed oil, sunflower seed oil, an ester of sunflower seed oil, corn oil, an ester of corn oil, peanut oil, an ester of peanut oil, sesame oil, an ester of sesame oil, olive oil, an ester of olive oil, castor oil and a combination thereof.

The herbicide compositions according to the present disclosure do not require a volatility control agent because of the low volatility properties of the TEA salt of 2,4-D used as compound (B) in the context of the present disclosure. Although the herbicide compositions according to the present disclosure do not require the presence or use of a volatility control agent, in some case it may be beneficial to include a volatility control agent into the herbicide compositions of the present disclosure. Consequently, herbicide compositions according to the present disclosure may comprise one or more volatility control agents, preferably one or more mono carboxylic acids and/or salts thereof, preferably one or more $C_1$-$C_4$-alkyl mono carboxylic acids and/or salts thereof, wherein preferably the mono carboxylic acids and/or salts thereof are selected from the group consisting of formic acid, acetic acid and the salts thereof.

In certain embodiments, an herbicide composition according to the present disclosure may therefore comprises a mono carboxylic acid at least partially neutralized with an inorganic base, preferably at least partially neutralized with an inorganic sodium base or potassium base, more preferably at least partially neutralized with sodium hydroxide or potassium hydroxide, particularly preferably at least partially neutralized with a 45% w/w potassium hydroxide solution. This general type of low volatility herbicide composition has been described in detail in U.S. Pat. No. 9,743,664.

In an herbicide composition according to the present disclosure the acid equivalent (a.e.) weight ratio of monocarboxylic acid, or monocarboxylate thereof, to compound (B) preferably is in the range of from about 1:10 to about 5:1.

In an herbicide composition according to the present disclosure the molar ratio of monocarboxylic acid, or monocarboxylate thereof, to compound (B) preferably is in the range from about 1:10 to about 10:1, preferably in the range from about 1:2 to about 6:1, more preferably in the range from about 1:1 to about 4:1.

In such an herbicide composition according to the present disclosure, if a neutralizing base is used to partially or fully neutralize the monocarboxylic acid(s), said neutralizing base and monocarboxylic acid preferably are combined at a molar ratio of about 1:1 (corresponding to about 100% neutralization of the monocarboxylic acid) to about 1:2 (corresponding to about 50% neutralization of the monocarboxylic acid), more preferably at a molar ratio of about 9:10 (corresponding to about 90% neutralization of the monocarboxylic acid) to about 3:5 (corresponding to about 60% neutralization of the monocarboxylic acid).

The herbicide compositions of the present disclosure preferably do not contain sodium or potassium ions in an amount that results in precipitation of the sodium or potassium salt of 2,4-dichlorophenoxyacetic acid in the herbicide composition or a dilution with water thereof.

The herbicide compositions of the present disclosure preferably are free of the monoethanolamine salt of dicamba, preferably free of dicamba.

Preferred embodiment M1 of herbicide compositions according to the present disclosure in the form of an oil-in-water microemulsion comprises compound (A) and compound (B) as defined herein in a ratio by weight of the total amount of compound (A) and the total amount of compound (B) in the range of from about 1:10 to about 1:150, a substantially water-immiscible organic solvent and one or more dispersants, wherein the pH-value of the diluted composition is less than 7.

Preferred embodiment M2 of herbicide compositions according to the present disclosure in the form of an oil-in-water microemulsion comprises compound (A) and compound (B) as defined herein in a ratio by weight of the total amount of compound (A) and the total amount of compound (B) in the range of from about 1:20 to 1:125, a substantially water-immiscible organic solvent such that compound (A) has an organic solvent/water partition coefficient, expressed as a logarithm, of about 4 or greater and one or more surfactants consisting of nonionic, cationic and/or anionic surfactants, wherein the pH-value of the diluted composition is in the range of about 4.0 to about 6.0 when diluted with water such that the concentration of the triethanolamine salt of 2,4-D corresponds to 1.8% by weight calculated as 2,4-dichlorophenoxyacetic acid and measured at 25° C. and 1013 mbar, and wherein said microemulsion comprises compound (B) in a total amount of up to about 75 wt.-%.

Preferred embodiment M3 of herbicide compositions according to the present disclosure in the form of an oil-in-water microemulsion comprises compound (A) and compound (B) as defined herein in a ratio by weight of the total amount of compound (A) and the total amount of compound (B) in the range of from about 1:20 to 1:100, a substantially water-immiscible organic solvent such that compound (A) has an organic solvent/water partition coefficient, expressed as a logarithm, of about 4 or greater, one or more surfactants consisting of nonionic, cationic and/or anionic surfactants, and one or more water-soluble organic stabilizing agents, wherein the pH-value of the diluted composition is in the range of about 4.5 to about 5.5 when diluted with water such that the concentration of the triethanolamine salt of 2,4-D corresponds to 1.8% by weight calculated as 2,4-dichlorophenoxyacetic acid and measured at 25° C. and 1013 mbar, and wherein said microemulsion comprises compound (B) in a total amount in the range from about 5 wt.-% to about 70 wt.-%, based on the total weight of the herbicide composition.

Preferred embodiment M4 of herbicide compositions according to the present disclosure in the form of an oil-in-water microemulsion comprises compound (A) and compound (B) as defined herein in a ratio by weight of the total amount of compound (A) and the total amount of compound (B) in the range of from about 1:20 to 1:80, a substantially water-immiscible organic solvent such that compound (A) has an organic solvent/water partition coefficient, expressed as a logarithm, of about 5 or greater, one or more surfactants consisting of nonionic, cationic and/or anionic surfactants, and one or more water-soluble organic stabilizing agents selected from the group consisting of organic halides, wherein the pH-value of the diluted composition is in the range of about 4.5 to about 5.5 when diluted with water such that the concentration of the triethanolamine salt of 2,4-D corresponds to 1.8% by weight calculated as 2,4-dichlorophenoxyacetic acid and measured at 25° C. and 1013 mbar, and wherein said microemulsion comprises compound (B) in a total amount in the range from about 5 wt.-% to about 65 wt.-%, based on the total weight of the herbicide composition.

Preferred embodiment M5 of herbicide compositions according to the present disclosure in the form of an oil-in-water microemulsion comprises compound (A) and compound (B) as defined herein in a ratio by weight of the total amount of compound (A) and the total amount of compound (B) in the range of from about 1:20 to 1:80, a substantially water-immiscible organic solvent such that compound (A) has an organic solvent/water partition coefficient, expressed as a logarithm, of about 6 or greater, one or more surfactants consisting of nonionic and/or anionic surfactants, and one or more water-soluble organic stabilizing agents selected from the group consisting of organic quaternary ammonium halides, wherein the pH-value of the diluted composition is in the range of about 4.6 to about 5.3 when diluted with water such that the concentration of the triethanolamine salt of 2,4-D corresponds to 1.8% by weight calculated as 2,4-dichlorophenoxyacetic acid and measured at 25° C. and 1013 mbar, and wherein said microemulsion comprises compound (B) in a total amount in the range from about 10 wt.-% to about 60 wt.-%, based on the total weight of the herbicide composition.

Preferred embodiment M6 of herbicide compositions according to the present disclosure in the form of an oil-in-water microemulsion comprises compound (A) and compound (B) as defined herein in a ratio by weight of the total amount of compound (A) and the total amount of compound (B) in the range of from about 1:20 to 1:60, a substantially water-immiscible organic solvent such that compound (A) has an organic solvent/water partition coefficient, expressed as a logarithm, of about 6 or greater, one or more surfactants consisting of nonionic and/or anionic surfactants, and one or more water-soluble organic stabilizing agents selected from the group consisting of organic quaternary ammonium chlorides, wherein the pH-value of the diluted composition is in the range of about 4.6 to about 5.3 when diluted with water such that the concentration of the triethanolamine salt of 2,4-D corresponds to 1.8% by weight calculated as 2,4-dichlorophenoxyacetic acid and measured at 25° C. and 1013 mbar, and wherein said microemulsion comprises compound (B) in a total amount in the range from about 10 wt.-% to about 60 wt.-%, based on the total weight of the herbicide composition.

Preferred embodiments M7 to M12 correspond to preferred embodiments M1 to M6 defined above, with the following additional feature(s): the ratio by weight of total amount of the substantially water-immiscible organic solvents to the total amount of compound (A) in herbicide composition according to the present disclosure is in the range of from about 4:1 to 40:1, preferably in the range of from about 6:1 to 30:1, and particularly preferably in the range of from about 8:1 to 25:1.

Preferred embodiments M13 to M24 correspond to preferred embodiments M1 to M12 defined above, with the following additional feature(s): the one or more dispersants are selected from the group consisting of phosphate esters; and/or the water-soluble stabilizing agents are present in a total amount of from about 1% to about 20% by weight, preferably from about 2% to about 17% by weight, more preferably from about 4% to about 16% by weight, in each case based on the total weight of the composition.

Preferred embodiments M25 to M36 correspond to preferred embodiments M1 to M12 defined above, with the following additional feature(s): the one or more dispersants are selected from the group consisting of phosphate esters with an average of 3-5 ethylene oxide (EO) units; and the water-soluble stabilizing organic agents are present in a total amount of from about 2% to about 17% by weight, based on the total weight of the composition.

Preferred embodiments M37 to M72 correspond to preferred embodiments M1 to M36 defined above, with the following additional feature(s): the one or more dispersants are selected from the group consisting of phosphate esters with an average of 3-5 ethylene oxide (EO) units; and the water-soluble stabilizing organic agents are present in a total amount of from about 4% to about 15% by weight, in each case based on the total weight of the composition.

Preferred embodiments M73 to M144 correspond to preferred embodiments M1 to M72 defined above, with the following additional feature: the substantially water-immiscible organic solvents are selected from the group consisting of acetophenone, benzyl acetate and aromatic hydrocarbons $C_{10}$-$C_{16}$, or mixtures thereof.

Preferred embodiments M145 to M288 correspond to preferred embodiments M1 to M144 defined above, with the following additional feature: the water-soluble organic stabilizing agents are selected from the group consisting of vitamin B4 (choline chloride; (2-hydroxyethyl)trimethylammonium chloride; CAS number 67-48-1) and/or vitamin B6 (pyridoxine hydrochloride; 4,5-bis(hydroxymethyl)-3-hydroxy-2-methylpyridine hydrochloride; 3-Hydroxy-4,5-bis (hydroxymethyl)-2-methylpyridine hydrochloride; CAS number 58-56-0).

Preferred embodiments M289 to M576 correspond to preferred embodiments M1 to M288 defined above, additionally comprising a drift retardant agent in a total amount in the range of about 2 wt.-% to about 8 wt.-%, more preferably in the range of about 3 wt.-% to about 7 wt.-%, and particularly preferably in the range of about 4 wt.-% to about 6 wt.-%, in each case based on the total weight of the composition.

Preferred embodiments M577 to M1152 correspond to preferred embodiments M1 to M576 defined above, additionally comprising a glyphosate salt, wherein the dispersants comprise or consist of alkylpolyglucosides, wherein the ratio by weight of the total amount of glyphosate calculated as free acid (i.e. calculated as acid equivalent) to the total amount of alkylpolyglucosides is in the range of about 8:1 to 1:2, preferably in the range of about 5:1 to 1:1, more preferably in the range of about 4:1 to 3:2, in each case based on the total weight of the composition.

Preferred embodiments M1153 to M2304 correspond to preferred embodiments M1 to M1152 defined above, additionally comprising one or more $C_1$-$C_4$-alkyl mono carboxylic acids selected from the group consisting of formic acid, acetic acid and the salts thereof, wherein the molar ratio of monocarboxylic acid, or monocarboxylate thereof, to compound (B) is in the range from about 1:10 to about 10:1, preferably in the range from about 1:2 to about 6:1, more preferably in the range from about 1:1 to about 4:1. In said preferred embodiments M1153 to M2304, preferably a neutralizing base and monocarboxylic acid are combined at a molar ratio of about 1:1 (corresponding to about 100% neutralization of the monocarboxylic acid) to about 1:2 (corresponding to about 50% neutralization of the monocarboxylic acid), more preferably at a molar ratio of about 9:10 (corresponding to about 90% neutralization of the monocarboxylic acid) to about 3:5 (corresponding to about 60% neutralization of the monocarboxylic acid).

The optimum ratio ranges or amounts of the further constituents and auxiliary ingredients optionally present in a composition according to the present disclosure depend to some extent on the loading of the total and relative amounts of active ingredients (including compounds (A) and (B) defined in the context of the present disclosure).

It is also to be noted that an amount of the organic solvent(s) sufficient to provide acceptable physical stability of the composition according to the present disclosure (i.e. a concentration sufficient to provide acceptable physical stability) and in particular also sufficient chemical stability of compound (A), i.e. minimization of the degradation of compound (A) in the composition according to the present disclosure, can be readily determined by one of skill in the art by routine evaluation of a range of compositions having differing amounts of the dispersant(s). Typically, physical stability of the composition is acceptable if no significant phase separation is evident following storage for at least 7 days at any temperature in the range from about 0° C. to about 40° C.

Further, a stabilizing amount of one or more selected water-soluble organic halide(s) mentioned above is an amount that provides acceptable physical stability of the compositions as defined in the context of the present disclosure, when present along with one or more dispersant(s) in an amount insufficient on its own to provide such stability. One of skill in the art can for example readily determine such a stabilizing amount by routine evaluation of a range of compositions having differing amounts of these selected water-soluble organic halide(s).

It is also to be noted that an amount of the dispersant(s) sufficient to provide acceptable physical stability of the composition according to the present disclosure (i.e. a concentration sufficient to provide acceptable physical stability) can be readily determined by one of skill in the art by routine evaluation of a range of compositions having differing amounts of the dispersant(s). Typically, physical stability of the composition is acceptable if no significant phase separation is evident following storage for at least 7 days at any temperature in the range from about 0° C. to about 40° C. Where the composition according to the present disclosure additionally contains one or more water-soluble organic halides(s) for acceptable or further improved physical stability, routine evaluation of differing amounts of the dispersant(s) is conducted in the presence of such water-soluble organic halides(s).

As further optional constituent or auxiliaries, the compositions of the disclosure can comprise customary formulation adjuvants, examples being inert materials, such as stickers, wetters, penetrants, preservatives, inorganic salts, film forming agents, frost protectants, fillers, colorants, evaporation inhibitors and pH modifiers (buffers, acids, and bases), viscosity modifiers (e.g., thickeners) or defoamers.

Examples of such customary formulation adjuvants suitable to be included in herbicide compositions according to the present disclosure are frost protectants (anti-freeze agents) like propylene glycol, and pH modifiers, often used as aqueous solution, such as formic acid, acetic acid, hydrochloric acid, ethanolamine, triethanolamine and ammonium hydroxide.

Depending on the total amount of surfactants or emulsifying agents present in an herbicidal composition according to the present disclosure, it may be advantageous to include a defoamer as constituent of a composition of the present disclosure. Suitable defoamers include all customary defoamers, preferably silicone-based defoamers, such as silicone oils, for example. The silicone oils can also be used as emulsions.

Defoamers from the group of the linear polydimethylsiloxanes contain as their chemical backbone a compound of the formula $HO—[Si(CH_3)_2—O—]_n—H$, in which the end groups are modified, by etherification for example, or in general are attached to the groups $—Si(CH_3)_3$. Advantageous defoamers are those from the group of the linear polydimethylsiloxanes, preferably containing silica. Silica embraces forms/modifications such as polysilicic acids, meta-silicic acid, ortho-silicic acid, silica gel, silicic acid gels, kieselguhr, precipitated $SiO_2$, etc.

The constituents optionally used to prepare and obtain the compositions in the context of the present disclosure are known and many of these constituents are commercially available.

The herbicide compositions of the present disclosure can be prepared by conventional methods, by mixing and homogenizing the compounds (A) and (B) as well as the different constituents in solid or already dissolved form, and all other constituents, with stirring where appropriate. Depending on the formulation type and the optionally present different further constituents of the composition according to the present disclosure, it may be beneficial to include a milling step, e.g. using a colloid mill or stirred bead mill.

A suitable process of preparing an herbicide composition of the present disclosure comprises mixing the various ingredients in a suitable vessel. It is important to note that mixing is not critical to the disclosure and any order of addition of ingredients is suitable. However, experience to date suggests that certain orders of addition in preparing compositions of the present disclosure require less (reaction) time. Therefore, a presently preferred order of addition of the ingredients involves adding all required surfactants to a concentrated aqueous solution of the water-soluble herbicide along with an acid or base for pH adjustment, if desired, to form a first mixture. Compound (A) is added to the organic solvent with agitation to form a second mixture. The second mixture is then added to the first mixture with agitation to form the finished composition, i.e. a composition or formulation according to the present disclosure.

An alternative order of addition involves mixing a concentrated aqueous solution of compound (B) together with other, optional, water-soluble (herbicidal active) ingredients including an acid and/or base for pH adjustment, with agitation to form a first mixture. Compound (A) is then added to the organic solvent with agitation to form a second mixture. The second mixture is added to the first mixture with agitation, then the surfactants are added. Agitation is continued until a physically stable composition or formulation according to the present disclosure is formed.

In a further aspect, the present disclosure relates to a method of manufacturing the herbicide composition as defined in the context of the present disclosure, preferably in one of the preferred, more preferred or particularly preferred embodiments as described herein, comprising the following steps: (i) providing water; (ii) providing compound (B); (iii) providing compound (A) dissolved in one or more organic solvents, wherein (i) at least one of said organic solvents is not fully miscible with water and wherein (ii) compound (A) has a solubility of 5 wt.-% or greater, preferably of 10 wt.-% or greater, in at least one of said organic solvents, in each case measured at 25° C. and 1013 mbar; and mixing the constituents provided in steps (i), (ii) and (iii).

The compositions of the present disclosure exhibit good chemical and/or physical stability, good storage properties (i.e. storage stability, including low-temperature stability) as well as allow high bioavailability, hence high activity of the crop protectant ingredients, i.e. of compounds (A) and (B).

The compositions of the present disclosure are especially suitable for use in crop protection for controlling unwanted plant growth both on uncultivated land and in crops tolerant to the herbicides of compounds (A) and (B) of the compositions of the present disclosure. Such tolerant crops can be tolerant either by nature or have been obtained by mutation/selection, or because of e.g. modifications like introduction of respective tolerance traits into transgenic plants. In this regard reference to reviews such as Plants 2019, 8, 337 or Pest Manag. Sci. 2005, 61(3), 277-85 is made.

Crops tolerant to compounds (A) and (B) can for example be cereals (e.g. barley, oat, rye, sorghum, wheat), corn (maize), cotton, oilseed rape (e.g. canola), rice, soybean, sunflower, sugarbeet and sugarcane.

In a further aspect, the present disclosure relates to a method for controlling undesired plant growth which comprises applying the herbicide composition as defined in the context of the present disclosure, preferably in one of the preferred, more preferred or particularly preferred embodiments as described herein onto the plants, parts of plants, plant seeds or the area where the plants grow, i.e. the cultivation area.

In a preferred embodiment, the method for controlling undesired plant growth is for the selective control of harmful plants in plant crops.

In a preferred embodiment, the method for controlling undesired plant growth is for the selective control of harmful plants in plant crops of monocotyledonous plants.

In own greenhouse experiments, the herbicidal (weed control) efficacy of herbicidal compositions according to the present disclosure was assessed and found to be herbicidally effective against glyphosate-resistant weed species (which were in some cases also resistant to PPO (protoporphyrinogen oxidase) herbicides), such as *Amaranthus palmeri* (Palmer amaranth), *Amaranthus tamariscinus* (waterhemp) and *Eleusine indica* (goosegrass), see Examples section hereinbelow.

Thus, in a further aspect, the herbicidal compositions according to the present disclosure can be used for controlling undesired plant growth of glyphosate-resistant weed species (optionally additionally also resistant to PPO herbicides), such as glyphosate-resistant *Amaranthus palmeri* (Palmer amaranth), glyphosate-resistant *Amaranthus tamariscinus* (waterhemp) and glyphosate-resistant *Eleusine indica* (goosegrass).

In another embodiment, the method for controlling undesired plant growth, the plant crops are genetically modified or have been obtained by mutation/selection.

In a further aspect, the present disclosure relates to the use of the herbicide composition defined in the context of the present disclosure, preferably in one of the preferred, more preferred or particularly preferred embodiments as described herein for controlling harmful plants, i.e. for controlling unwanted plant growth.

An herbicide composition according to the present disclosure, in particular in one of the preferred, more preferred or particularly preferred embodiments as described herein, is typically diluted with water before application enough to be readily sprayed using standard agricultural spray equipment.

Suitable application rates for the present disclosure vary depending upon such factors as the concentrations of the active ingredients and the plant species involved. Useful rates for applying an aqueous composition to a field of foliage can range from about 50 liters to about 1,000 liters per hectare (1/ha), preferably about 1001/ha to about 4001/ha, by spray application.

Thus, in a further aspect the present disclosure relates to a tank mix composition suitable to be sprayed using standard agricultural spray equipment, wherein said tank mix composition is obtainable by mixing an herbicide composition according to the present disclosure with an appropriate amount of water, optionally adding one or more further ingredients selected from the group of further herbicidal active ingredients and further auxiliaries.

Preferably, the total amount of water for obtaining such a tank mix composition according to the present disclosure is in the range of about 50 liters to about 1,000 liters, more preferably of about 100 liters to about 400 liters, per kg of herbicide composition according to the present disclosure.

A weed control practitioner can readily select and determine the application rates of herbicide composition according to the present disclosure that are herbicidally effective on particular species at particular growth stages in particular environmental conditions. Generally, preferred application rates for herbicide composition according to the present disclosure, in particular in one of the preferred, more preferred or particularly preferred embodiments as described herein are from about 50 to about 1500 g dicamba a. e./ha, more preferably from about 100 to about 750 g dicamba a. e./ha, even more preferably from about 150 to about 600 g dicamba a. e./ha.

Application of an herbicide composition according to the present disclosure, in particular in one of the preferred, more preferred or particularly preferred embodiments as described herein, to foliage of plants is preferably accomplished by spraying, using any conventional means for spraying liquids, such as spray nozzles or spinning-disk atomizers. An herbicide composition according to the present disclosure, in particular in one of the preferred, more preferred or particularly preferred embodiments as described herein, can be used in precision farming techniques, in which apparatus is employed to vary the amount of exogenous chemical substance applied to different parts of a field, depending on variables such as the particular plant species present, plant growth stage, soil moisture status, etc. In one embodiment of such techniques, a global positioning system operated with the spraying apparatus can be used to apply the desired amount of the composition to different parts of a field.

The herbicide compositions of the present disclosure can be applied to any and all plant species on which compounds (A) and/or (B) are biologically effective. Therefore, for example, the herbicide compositions of the present disclosure can be applied to a plant in an herbicidally effective amount, and can effectively control one or more plant species of one or more of the following genera: *Abutilon, Afnaranthus, Artemisia, Asclepias, Avena, Axonopus, Borreria, Brachiaria, Brassica, Bromus, Chenopodium, Cirsium, Commelina, Convolvulus, Cynodon, Cyperus, Digitaria, Echinochloa, Eleusifze, Elymus, Equisetum, Erodium, Helianthus, Imperata, Ipomoea, Kochia, Lolium, Malva, Oryza, Ottochloa, Panicum, Paspalum, Phalaris, Phragmites, Polygonum, Portulaca, Pteridium, Pueraria, Rubus, Salsola, Setaria, Sida, Sinapis, Sorghum, Triticum, Typha, Ulex, Xanthium* and *Zea.*

Particularly important annual broadleaf species for which the herbicide compositions of the present disclosure can be used are for example the following: velvetleaf (*Abutilon theophrasti*), pigweed (*Amaranthus* spp.), buttonweed (*Borreria* spp.), oilseed rape, canola, Indian mustard, etc. (*Brassica* spp.), *Commelina* (*Commelina* spp.), filaree (*Erodium* spp.), sunflower (*Helianthus* spp.), morning glory (*Ipomoea* spp.), *Kochia* (*Kochia scoparia*), mallow (*Malva* spp.), wild buckwheat, smartweed, etc. (*Polygonum* spp.), purslane (*Portulaca* spp.), russian thistle (*Salsola* spp.), *Sida* (*Sida* spp.), wild mustard (*Sinapis arvensis*) and cocklebur (*Xanthium* spp.)

Particularly important annual narrowleaf species for which the herbicide compositions of the present disclosure can be used are for example the following: wild oat (*Avena fatua*), carpetgrass (*Axonopus* spp.), downy brome (*Bromus tectorum*), crabgrass (*Digitaria* spp.), barnyardgrass (*Echinochloa crus-galli*), goosegrass (*Eleusine indica*), annual ryegrass (*Lolium multiflorum*), rice (*Oryza sativa*), *Ottochloa* (*Ottochloa nodosa*), bahiagrass (*Paspalum notatum*), canarygrass (*Phalaris* spp.), foxtail (*Setaria* spp.), wheat (*Triticum aestivum*) and corn (*Zea mays*).

Particularly important perennial broadleaf species for which the herbicide compositions of the present disclosure can be used are for example the following: mugwort (*Artemisia* spp.), milkweed (*Asclepias* spp.), Canada thistle (*Cirsium arvense*), field bindweed (*Convolvulus arvensis*) and kudzu (*Pueraria* spp.).

Particularly important perennial narrowleaf species for which for which the herbicide compositions of the present disclosure can be used are for example the following: *Brachiaria* (*Brachiaria* spp.), bermudagrass (*Cynodon dactylon*), yellow nutsedge (*Cyperus esculentus*), purple nutsedge (*Cyperus rotundus*), quackgrass (*Elymus repens*), lalang (*Imperata cylindrica*), perennial ryegrass (*Lolium perenne*), guineagrass (*Panicum maximum*), dallisgrass (*Paspalum dilatatum*), reed (*Phragmites* spp.), johnsongrass (*Sorghum halepense*) and cattail (*Typha* spp.).

Other particularly important perennial species for which the herbicide compositions of the present disclosure can be used are for example the following: horsetail (*Equisetum* spp.), bracken (*Pteridium aquilinum*), blackberry (*Rubus* spp.) and gorse (*Ulex europaeus*).

EXAMPLES

Unless indicated otherwise, all amounts indicated in the following are by weight.

G1: General Experimental Procedure to Determine the Partition Coefficient of Compound (A) in Solvents The experimental procedure for the respective solvent is as follows: (1) A solution of 10 g of compound (A) is prepared in 90 g of the respective solvent; (2) An aliquot of 10 g of the solution obtained in step (1) is added to 90 g of water in a glass bottle, which is shaken on a mechanical shaker for 4 hours at ambient temperature (approximately 25° C.); (3) The contents of the glass bottle are permitted to phase separate for 4 days at ambient temperature (approximately 25° C.); and (4) Subsamples of the resulting oil and water phases are taken and analyzed by HPLC to determine the concentrations of compound (A) in oil (Co) and water phases (Cw) respectively. The subsamples are typically centrifuged before HPLC analysis to remove traces of organic solvent from the water phase.

The partition coefficient, analogous to the octanol-water partition coefficient, P, is calculated as Co/Cw. The partition coefficient is conveniently expressed as a logarithm pKa=log Co/Cw=P.

The ratio of determined concentrations of compound (A) in the solvent phase and the water phase typically is very large. In most cases, the concentration of compound (A) in water was found to be extremely low, often below the detection limit of the HPLC method. In other cases, traces of the organic solvent are found in the water phase, even after centrifugation, so that the apparent concentration of oil-soluble herbicide observed in the water phase is misleadingly high. In own experiments for example with acetophenone or Aromatic 200 ND as organic solvents, compound (A) was undetectable in the respective water phase.

Abbreviations and Products Used ae or a.e.=Acid Equivalent
ai or a.i.=(Amount of) Active Ingredient
Aromatic 200 ND=Mixture of aromatic hydrocarbons $C_{10}$-$C_{16}$ (ExxonMobil)
Cmp. A=Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate, 98% purity
Cmp. B=Aqueous solution of triethanolamine salt of 2,4-dichlorophenoxyacetic acid (2,4-D) prepared according to the General experimental procedure G2 described below; approx. 42 wt.% a.e. of 2,4-D
DI Water=Deionized water
DRA2=Drift Retardant Agent containing fatty acids, soya, methyl esters
3EO PhosE=Phosphate ester with an average of 3 ethylene oxide (EO) units
4EO PhosE=Phosphate ester with an average of 3 ethylene oxide (EO) units
5EO PhosE=Phosphate ester with an average of 5 ethylene oxide (EO) units
Phosphoric acid=Phosphoric acid 85% in water The herbicidal compositions described in Tables 1 to 15 and 15a are microemulsions in accordance with the present disclosure with an average oil droplet size smaller than 100 nm.

G2: General Experimental Procedure for the Preparation of Triethanolamine Salt of 2,4-D Water (e.g. 26.49 g) is placed in a suitable vessel (formulation container), followed by the required amount of triethanolamine (e.g. 31.04 g). The resulting mixture is stirred to form an aqueous solution of triethanolamine in water. To this mixture the required amount of 2,4-dichlorophenoxyacetic acid (e.g. 42.47 g), technical quality, are added with stirring and mixed until 2,4-D has dissolved completely.

G3: General Experimental Procedure for Producing Liquid Herbicide Concentrates in the Form of Microemulsions According to the Present Disclosure, in Particular Those Described in Tables 1 to 15 and 15a Hereinafter During the whole experimental procedure while adding ingredients, the content of the vessel was constantly stirred with moderate agitation.

Generally, compositions (in the form of a microemulsion) according to the present disclosure can be prepared by first adding water to the vessel followed by adding the ingredient(s) in solid form, if any, making sure that said solid ingredient(s) is/are dissolved. Subsequently, all other liquid components can be added in any order.

In a vessel (formulation tank) equipped with an overhead electric stirrer (mixer motor) in step (1) DI Water is placed, followed by step (2) the addition of the triethanolamine salt of 2,4-D. Alternatively, step (1) and step (2) can be combined by placing an aqueous solution of the triethanolamine salt of 2,4-D, e.g. as described in the General experimental procedure G2 above, in a vessel (formulation tank). In step (3) Cmp. A dissolved in a suitable organic solvent is added to this mixture. In step (4) one or more drift retardant agents may be added to the mixture resulting from steps (1) to (3). Subsequently, in step (5) one or more dispersants are added to the mixture. The whole content of the vessel was stirred for 30-45 minutes after the addition of the last ingredient, using a Caframo model 3030/AKA R20 digital or a suitable mixer at about 600 rpm, resulting in the final liquid herbicide concentrate in the form of a microemulsion.

When following the above procedure by using in combined steps (1) and (2) 55.16 g of the aqueous solution of the TEA salt of 2,4-D obtained according to the General Procedure G2 above, 20.45 g of a solution of 0.84 g of Cmp. B in 19.61 g Aromatic 200 ND in step (3), and 5.27 g of DRA2 and 19.12 g of dispersant 5EO PhosE in steps (4) and (5), respectively, the herbicide composition B233 in Table 11 is obtained.

Crodafos O5A 5EO PhosE is known under the INCI-name "Oleth-5 Phosphate", a complex ester of phosphoric acid and ethoxylated cosmetic grade oleyl alcohol.

G4: General Experimental Procedure for Accelerated Stability Testing at 54° C. of Herbicide Compositions, in Particular Those Described in Tables 1 to 15 and 15a Hereinafter About 20 mL of the herbicidal composition to be tested were dispensed in a glass vial. The glass vial was then tightly sealed with a vial cap and placed in an approved incubator at 54° C. for two weeks (14 days). After this time, the glass vial is removed from the incubator and the vial content analyzed to determine the amount of these respective active ingredients therein.

The compositions in the following Tables 1 to 15 and 15a are clear microemulsion that were physically stable when stored at 54° C. for 2 weeks, at 40° C. for 8 weeks and at −20° C. for several weeks. The microemulsions exhibited good dispersion in water. The first column of each Table indicates the ingredients used to produce the respective herbicidal composition which is referenced with a Sample ID (i.e. the sample reference number) indicated in the first line of the respective column.

TABLE 1

| Herbicidal Compositions (microemulsions) with DRA | | | | | | |
|---|---|---|---|---|---|---|
| Ingredients | B154 | B155 | B162 | B163 | B167 | B175a |
| Cmp. B | 66.62% | 69.12% | 69.76% | 70.09% | 67.46% | 61.41% |
| Cmp. A | 0.51% | 0.53% | 0.54% | 0.55% | 0.51% | 0.47% |
| Acetophenone | 4.66% | 4.84% | 4.88% | 4.89% | 4.74% | 4.30% |
| DRA2 | 5.87% | 6.34% | 6.46% | 6.57% | 5.81% | 5.18% |
| 5EO PhosE | 6.99% | — | 5.88% | 5.95% | 5.94% | — |
| 3EO PhosE | — | 3.50% | — | — | — | 7.36% |
| Formic Acid | — | — | 1.67% | 1.09% | — | — |
| 1N HCl in water | — | — | — | — | 15.54% | — |
| 37% HCl in water | — | — | — | — | — | 4.95% |
| DI Water | 15.35% | 15.67% | 10.81% | 10.86% | — | 16.33% |
| Total: | 100.00% | 100.00% | 100.00% | 100.00% | 100.00% | 100.00% |

TABLE 2

| Herbicidal Compositions (microemulsions) with DRA | | | | | | |
|---|---|---|---|---|---|---|
| Ingredients | B175b | B176 | B177 | B178a | B178b | B178c |
| Cmp. B | 55.70% | 51.26% | 51.61% | 61.37% | 64.25% | 65.43% |
| Cmp. A | 0.43% | 0.40% | 0.40% | 0.94% | 0.98% | 1.00% |
| Acetophenone | 3.90% | 3.58% | 3.61% | 22.40% | 19.00% | 19.35% |
| DRA2 | 4.80% | 5.09% | 4.54% | 5.29% | 5.90% | 5.76% |
| 5EO PhosE | 8.77% | — | 10.83% | 10.00% | 9.87% | — |
| 3EO PhosE | — | 10.76% | — | — | — | 8.46% |
| 1N HCl in water | — | 28.91% | 29.01% | — | — | — |
| 37% HCl in water | 4.59% | — | — | — | — | — |
| DI Water | 21.81% | — | — | — | — | — |
| Total: | 100.00% | 100.00% | 100.00% | 100.00% | 100.00% | 100.00% |

TABLE 3

| Herbicidal Compositions (microemulsions) with DRA | | | | | | |
|---|---|---|---|---|---|---|
| Ingredients | B178d | B179 | B180 | B181 | B182 | B183 |
| Cmp. B | 60.17% | 56.01% | 56.36% | 56.84% | 57.12% | 57.24% |
| Cmp. A | 0.92% | 0.85% | 0.86% | 0.87% | 0.87% | 0.89% |
| Acetophenone | 14.67% | 13.66% | 13.75% | 13.86% | 13.92% | 13.94% |
| DRA2 | 5.41% | 4.83% | 4.75% | 4.90% | 4.92% | 4.93% |
| 5EO PhosE | — | 9.02% | 9.29% | 9.37% | 9.63% | 9.65% |
| 3EO PhosE | 7.33% | — | — | — | — | — |
| 1N HCl in water | 11.50% | 15.63% | 14.99% | 14.16% | 13.54% | 13.35% |
| Total: | 100.00% | 100.00% | 100.00% | 100.00% | 100.00% | 100.00% |

TABLE 4

| Herbicidal Compositions (microemulsions) with DRA | | | | | | |
|---|---|---|---|---|---|---|
| Ingredients | B184a | B184b | B185 | B186 | B187 | B188 |
| Cmp. B | 50.02% | 56.48% | 59.24% | 63.09% | 64.54% | 64.70% |
| Cmp. A | 0.76% | 0.87% | 0.92% | 0.98% | 1.00% | 1.00% |
| Acetophenone | 12.19% | 13.77% | 14.42% | 15.36% | 15.72% | 15.76% |
| DRA2 | 5.25% | 5.29% | 5.22% | 6.15% | 5.68% | 5.94% |
| 5EO PhosE | 8.25% | 6.03% | 9.10% | 8.51% | 10.64% | 11.39% |
| Benzalkonium Chloride | 5.72% | 6.98% | — | — | — | — |

TABLE 4-continued

| Herbicidal Compositions (microemulsions) with DRA | | | | | | |
|---|---|---|---|---|---|---|
| Ingredients | B184a | B184b | B185 | B186 | B187 | B188 |
| Acetic Acid | — | — | 11.10% | 5.91% | 2.42% | 1.21% |
| DI Water | 17.81% | 10.58% | — | — | — | — |
| Total: | 100.00% | 100.00% | 100.00% | 100.00% | 100.00% | 100.00% |

TABLE 5

| Herbicidal Compositions (microemulsions) with DRA | | | | | | |
|---|---|---|---|---|---|---|
| Ingredients | B195 | B196 | B197 | B198 | B199 | B200 |
| Cmp. B | 44.67% | 60.60% | 65.59% | 61.21% | 56.99% | 60.38% |
| Cmp. A | 0.69% | 0.94% | 1.02% | 0.95% | 0.89% | 0.94% |
| Acetophenone | 10.88% | 8.48% | 9.18% | 14.91% | 20.78% | 14.70% |
| DRA2 | 4.18% | 5.68% | 6.27% | 5.73% | 5.34% | 5.88% |
| 5EO PhosE | 10.04% | 10.10% | 10.57% | 10.21% | 9.50% | — |
| 3EO PhosE | — | — | — | — | — | 7.47% |
| Acetic Acid | 0.67% | — | — | — | — | — |
| 1N HCl in water | — | 14.20% | — | — | — | — |
| 2N HCl in water | — | — | 7.37% | 6.99% | 6.50% | 10.63% |
| Vitamin B6 | 6.69% | — | — | — | — | — |
| Propylene glycol | 4.43% | — | — | — | — | — |
| DI Water | 17.75% | — | — | — | — | — |
| Total: | 100.00% | 100.00% | 100.00% | 100.00% | 100.00% | 100.00% |

TABLE 6

| Herbicidal Compositions (microemulsions) with DRA | | | |
|---|---|---|---|
| Ingredients | B201 | B202 | B203 |
| Cmp. B | 60.72% | 62.13% | 59.04% |
| Cmp. A | 0.94% | 0.97% | 0.92% |
| Aromatic 200ND | 14.79% | 15.13% | 14.38% |
| DRA2 | 5.80% | 5.82% | 5.53% |
| 5EO PhosE | — | 9.08% | 13.60% |

TABLE 6-continued

| Herbicidal Compositions (microemulsions) with DRA | | | |
|---|---|---|---|
| Ingredients | B201 | B202 | B203 |
| 4EO PhosE | 12.06% | — | — |
| Phosphoric Acid | 5.69% | 6.87% | 6.53% |
| Total: | 100.00% | 100.00% | 100.00% |

TABLE 7

| Herbicidal Compositions (microemulsions) with DRA | | | | | | |
|---|---|---|---|---|---|---|
| Ingredients | B204 | B205 | B210 | B212 | B213 | B214 |
| Cmp. B | 64.31% | 61.42% | 58.29% | 49.28% | 60.38% | 48.00% |
| Cmp. A | 1.00% | 0.95% | 0.91% | 0.77% | 0.94% | 0.75% |
| Aromatic 200ND | 15.66% | 14.96% | 21.25% | 12.00% | 14.70% | 11.69% |
| DRA2 | 5.66% | 5.29% | 5.13% | 4.34% | 5.54% | 4.23% |
| 5EO PhosE | — | — | 8.74% | — | — | 8.09% |
| 3EO PhosE | 6.87% | 8.28% | — | 5.91% | 8.03% | — |
| Phosphoric Acid | 6.50% | 7.72% | 5.68% | 5.81% | 6.11% | 5.40% |
| Ethanolamine | — | 1.38% | — | — | — | — |
| Vitamin B4 | — | — | — | 4.99% | — | 5.49% |
| 2N HCl in water | — | — | — | — | 4.30% | — |
| DI Water | — | — | — | 16.90% | — | 16.35% |
| Total: | 100.00% | 100.00% | 100.00% | 100.00% | 100.00% | 100.00% |

TABLE 8

| Herbicidal Compositions (microemulsions) with DRA | | | | | | |
|---|---|---|---|---|---|---|
| Ingredients | B215 | B216 | B217 | B218 | B219 | B220 |
| Cmp. B | 46.90% | 57.41% | 58.73% | 58.27% | 58.78% | 58.78% |
| Cmp. A | 0.73% | 0.89% | 0.91% | 0.91% | 0.91% | 0.91% |

TABLE 8-continued

| Herbicidal Compositions (microemulsions) with DRA | | | | | | |
|---|---|---|---|---|---|---|
| Ingredients | B215 | B216 | B217 | B218 | B219 | B220 |
| Acetophenone | — | 20.94% | 10.71% | — | — | — |
| Aromatic 200ND | 11.42% | — | 10.71% | 14.19% | 14.32% | 14.32% |
| DRA2 | 4.74% | 4.95% | 5.23% | 5.35% | 5.07% | 5.07% |
| 5EO PhosE | 7.82% | 9.36% | 10.79% | 7.75% | 9.25% | 9.25% |
| Phosphoric Acid | 4.83% | — | 2.92% | 5.89% | 5.84% | 5.84% |
| Vitamin B4 | 7.47% | — | — | — | — | — |
| 2N HCl in water | — | 6.45% | — | 7.64% | — | — |
| DI Water | 16.09% | — | — | — | 5.83% | 5.83% |
| Total: | 100.00% | 100.00% | 100.00% | 100.00% | 100.00% | 100.00% |

TABLE 9

| Herbicidal Compositions (microemulsions) with DRA | | | | | | |
|---|---|---|---|---|---|---|
| Ingredients | B221 | B222 | B223 | B224 | B225 | B226 |
| Cmp. B | 62.13% | 55.37% | 40.62% | 51.49% | 51.49% | 53.50% |
| Cmp. A | 0.97% | 0.86% | 0.63% | 0.80% | 0.80% | 0.83% |
| Aromatic 200ND | 15.13% | 13.48% | 9.89% | 18.77% | 18.77% | 19.51% |
| DRA2 | 5.59% | 4.88% | 3.58% | 4.63% | 4.63% | 4.81% |
| 5EO PhosE | 9.54% | 14.31% | 10.12% | 16.01% | — | — |
| 3EO PhosE | — | — | — | — | 16.01% | 16.64% |
| Phosphoric Acid | 6.40% | — | — | — | — | — |
| Vitamin B4 | — | — | 6.47% | — | — | — |
| Ammonium hydroxide (28-30% in water) | 0.24% | — | — | — | — | — |
| Acetic acid | — | 11.10% | 7.61% | 8.30% | 8.30% | 4.71% |
| DI Water | — | — | 21.08% | — | — | — |
| Total: | 100.00% | 100.00% | 100.00% | 100.00% | 100.00% | 100.00% |

TABLE 10

| Herbicidal Compositions (microemulsions) with DRA | | | | | | |
|---|---|---|---|---|---|---|
| Ingredients | B227 | B228 | B229 | B230 | B231 | B232 |
| Cmp. B | 54.38% | 55.51% | 56.52% | 55.62% | 53.28% | 52.88% |
| Cmp. A | 0.85% | 0.86% | 0.87% | 0.84% | 0.81% | 0.80% |
| Aromatic 200ND | 19.82% | 20.24% | 20.38% | 19.78% | 18.94% | 18.80% |
| DRA2 | 4.79% | 4.99% | 5.08% | 5.00% | 4.79% | 4.76% |
| 5EO PhosE | — | 18.40% | 17.15% | 18.76% | 22.06% | 22.49% |
| 3EO PhosE | 18.34% | — | — | — | — | — |
| Triethanolamine | — | — | — | — | 0.12% | 0.27% |
| Acetic acid | 1.82% | — | — | — | — | — |
| Total: | 100.00% | 100.00% | 100.00% | 100.00% | 100.00% | 100.00% |

TABLE 11

| Herbicidal Compositions (microemulsions) with DRA | | | | | | |
|---|---|---|---|---|---|---|
| Ingredients | B233 | B234 | B235 | B236 | B237 | B238 |
| Cmp. B | 55.16% | 59.20% | 61.73% | 48.58% | 42.14% | 55.16% |
| Cmp. A | 0.84% | 0.90% | 0.94% | 0.74% | 0.64% | 0.84% |
| Acetophenone | — | 21.05% | 21.95% | — | 14.98% | — |
| Aromatic 200ND | 19.61% | — | — | 17.28% | — | 19.61% |
| DRA2 | 5.27% | 5.10% | 5.32% | 4.55% | 3.95% | 5.27% |
| 5EO PhosE | 19.12% | 9.98% | 10.06% | — | — | 19.12% |

TABLE 11-continued

| Herbicidal Compositions (microemulsions) with DRA | | | | | | |
|---|---|---|---|---|---|---|
| Ingredients | B233 | B234 | B235 | B236 | B237 | B238 |
| 3EO PhosE | — | — | — | 23.48% | 15.32% | — |
| Triethanolamine | — | 3.77% | — | 5.37% | — | — |
| Vitamin B4 | — | — | — | — | 6.87% | — |
| DI Water | — | — | — | — | 16.10% | — |
| Total: | 100.00% | 100.00% | 100.00% | 100.00% | 100.00% | 100.00% |

TABLE 12

| Herbicidal Compositions (microemulsions) with DRA | | | | | | |
|---|---|---|---|---|---|---|
| Ingredients | B241 | B242 | B245 | B246 | B252 | B253 |
| Cmp. B | 39.73% | 38.94% | 35.27% | 34.68% | 33.22% | 33.10% |
| Cmp. A | 0.60% | 0.59% | 0.54% | 0.53% | 0.50% | 0.50% |
| Acetophenone | — | — | — | 12.49% | — | — |
| Aromatic 200ND | 14.13% | 13.85% | 8.48% | — | 11.82% | 11.77% |
| DRA2 | 4.24% | 4.16% | 3.57% | 3.77% | 3.67% | 3.53% |
| 5EO PhosE | 18.90% | 17.22% | 15.40% | — | 15.81% | 15.56% |
| 3EO PhosE | — | — | — | 15.01% | — | — |
| Vitamin B4 | 7.37% | 9.70% | 10.04% | 10.46% | 9.40% | 10.17% |
| DI Water | 15.03% | 15.54% | 26.70% | 23.06% | 25.58% | 25.37% |
| Total: | 100.00% | 100.00% | 100.00% | 100.00% | 100.00% | 100.00% |

TABLE 13

| Herbicidal Compositions (microemulsions) with DRA | | | | | | |
|---|---|---|---|---|---|---|
| Ingredients | B254 | B255 | B256 | B257 | B258 | B271 |
| Cmp. B | 32.22% | 36.24% | 38.74% | 41.08% | 39.37% | 30.69% |
| Cmp. A | 0.49% | 0.56% | 0.60% | 0.63% | 0.60% | 0.47% |
| Acetophenone | 11.58% | 13.02% | 5.36% | 3.57% | 5.44% | 11.03% |
| DRA2 | 3.74% | 4.01% | 3.41% | 3.69% | 4.35% | 3.56% |
| 5EO PhosE | 14.37% | 12.15% | 11.25% | 13.16% | 11.95% | 13.68% |
| Vitamin B4 | 12.61% | 13.58% | 10.74% | 10.77% | 11.87% | 16.77% |
| Decanol | — | 3.39% | 3.92% | — | 3.69% | — |
| DI Water | 24.99% | 17.05% | 25.98% | 27.10% | 22.73% | 23.80% |
| Total: | 100.00% | 100.00% | 100.00% | 100.00% | 100.00% | 100.00% |

TABLE 14

| Herbicidal Compositions (microemulsions) with DRA | | | | | |
|---|---|---|---|---|---|
| Ingredients | B272 | B273 | B274 | B279 | B280 |
| Cmp. B | 35.27% | 32.22% | 55.26% | 62.43% | 62.47% |
| Cmp. A | 0.54% | 0.49% | 0.87% | 0.99% | 0.99% |
| Aceto-phenone | — | 11.58% | — | 23.17% | 23.30% |
| Benzyl acetate | — | — | — | — | — |
| Aromatic 200ND | 8.49% | — | 20.51% | — | — |
| DRA2 | 3.57% | 3.74% | 4.97% | 5.61% | 5.62% |
| 5EO PhosE | 15.40% | 14.37% | 18.39% | 7.80% | 7.62% |
| Vitamin B4 | 10.04% | 12.61% | — | — | — |
| DI Water | 26.69% | 24.99% | — | — | — |
| Total: | 100.00% | 100.00% | 100.00% | 100.00% | 100.00% |

TABLE 15

| Herbicidal Compositions (microemulsions) with DRA | | |
|---|---|---|
| Ingredients | B303 | B304 |
| Cmp. B | 62.66% | 71.00% |
| Cmp. A | 0.95% | 0.54% |
| Acetophenone | — | — |
| Benzyl acetate | 22.31% | 12.64% |
| DRA2 | 6.17% | 6.41% |
| 5EO PhosE | 7.90% | 9.41% |
| Total: | 100.00% | 100.00% |

TABLE 15a

| Herbicidal Compositions (microemulsions) with or without DRA | | | | |
|---|---|---|---|---|
| Ingredients | B357 | B358 | B361 | B362 |
| Cmp. B | 69.70% | 74.17% | 69.70% | 74.17% |
| Cmp. A | 0.54% | 0.58% | 0.54% | 0.58% |
| Acetophenone | 12.76% | 13.59% | — | — |
| Benzyl acetate | — | — | 12.76% | 13.59% |
| DRA2 | 6.05% | — | 6.05% | — |
| 5EO PhosE | 10.95% | 11.66% | 10.95% | 11.66% |
| Total: | 100.00% | 100.00% | 100.00% | 100.00% |

Details of the respective %-recovery of compound (A) (Cmp. A) and of 2,4-D after accelerated stability tests (54° C., 2 weeks) are shown in Tables 16 to 20. In the Tables 16 to 20 also the pH-value (pH) is indicated, measured after dilution of the respective herbicidal composition with water such that the concentration of the triethanolamine salt of 2,4-D corresponds to 1.8% by weight calculated as 2,4-D acid and measured at 25° C. and 1013 mbar.

TABLE 16

Recovery of compounds (A) and 2,4-D in % after storage at 54° C. for 2 weeks

| Sample | % ae | | | | % Recovery | |
|---|---|---|---|---|---|---|
| ID | 2,4-D | Solvent | Surfactant | pH | Cmp. A | 2,4-D |
| B154 | 28.43 | Acetophenone | 5EO PhosE | 6.89 | 43.46 | 102.09 |
| B155 | 29.49 | Acetophenone | 3EO PhosE | 6.89 | 59.58 | 101.54 |
| B162 | 29.76 | Acetophenone | 5EO PhosE | 4.48 | 73.91 | 101.22 |
| B163 | 29.19 | Acetophenone | 5EO PhosE | 4.89 | 69.99 | 103.21 |
| B167 | 28.78 | Acetophenone | 5EO PhosE | 5.40 | 68.44 | 102.10 |
| B175a | 26.20 | Acetophenone | 3EO PhosE | 3.79 | 74.73 | 100.68 |
| B175b | 23.77 | Acetophenone | 5EO PhosE | 3.79 | 71.94 | 100.54 |
| B176 | 21.87 | Acetophenone | 3EO PhosE | 3.79 | 74.32 | 102.62 |
| B177 | 22.02 | Acetophenone | 5EO PhosE | 3.79 | 76.19 | 101.95 |
| B178a | 26.19 | Acetophenone | 5EO PhosE | 6.62 | 88.37 | 102.91 |
| B178b | 27.42 | Acetophenone | 5EO PhosE | 6.60 | 70.18 | 101.88 |
| B178c | 27.92 | Acetophenone | 5EO PhosE | 6.60 | 58.48 | 102.36 |
| B178d | 25.68 | Acetophenone | 5EO PhosE | 5.56 | 74.90 | 102.87 |
| B179 | 23.90 | Acetophenone | 5EO PhosE | 4.81 | 81.28 | 102.75 |
| B180 | 24.04 | Acetophenone | 5EO PhosE | 4.86 | 82.44 | 103.18 |
| B181 | 23.90 | Acetophenone | 5EO PhosE | 4.81 | 83.69 | 103.65 |
| B182 | 23.90 | Acetophenone | 5EO PhosE | 4.88 | 83.82 | 104.87 |
| B183 | 24.42 | Acetophenone | 5EO PhosE | 4.93 | 83.49 | 102.62 |

TABLE 17

Recovery of compounds (A) and 2,4-D in % after storage at 54° C. for 2 weeks

| Sample | % ae | | | | % Recovery | |
|---|---|---|---|---|---|---|
| ID | 2,4-D | Solvent | Surfactant | pH | Cmp. A | 2,4-D |
| B184a | 21.34 | Acetophenone | 5EO PhosE | 6.83 | 73.37 | 102.58 |
| B184b | 24.10 | Acetophenone | 5EO PhosE | 6.83 | 60.83 | 102.87 |
| B185 | 25.28 | Acetophenone | 5EO PhosE | 4.28 | 67.17 | 104.03 |
| B186 | 26.92 | Acetophenone | 5EO PhosE | 4.48 | 71.31 | 101.94 |
| B187 | 27.54 | Acetophenone | 5EO PhosE | 4.86 | 74.21 | 102.91 |
| B188 | 27.61 | Acetophenone | 5EO PhosE | 5.06 | 72.63 | 102.84 |
| B195 | 19.06 | Acetophenone | 5EO PhosE | 6.83 | 74.12 | 102.83 |
| B196 | 25.86 | Acetophenone | 5EO PhosE | 4.90 | 76.30 | 102.55 |
| B197 | 27.99 | Acetophenone | 5EO PhosE | 5.11 | 77.70 | 102.14 |
| B198 | 26.12 | Acetophenone | 5EO PhosE | 5.08 | 79.46 | 102.45 |
| B199 | 24.32 | Acetophenone | 5EO PhosE | 5.25 | 82.64 | 102.96 |
| B200 | 25.76 | Acetophenone | 3EO PhosE | 4.93 | 78.59 | 102.17 |
| B201 | 25.76 | Acetophenone | 4EO PhosE | 4.93 | 78.48 | 103.49 |
| B202 | 25.76 | Aromatic 200ND | 5EO PhosE | 3.78 | 77.58 | 99.96 |
| B203 | 25.19 | Aromatic 200ND | 5EO PhosE | 3.78 | 79.22 | 100.99 |

TABLE 17-continued

Recovery of compounds (A) and 2,4-D in % after storage at 54° C. for 2 weeks

| Sample | % ae | | | | % Recovery | |
|---|---|---|---|---|---|---|
| ID | 2,4-D | Solvent | Surfactant | pH | Cmp. A | 2,4-D |
| B204 | 27.44 | Aromatic 200ND | 3EO PhosE | 3.78 | 77.30 | 99.71 |
| B205 | 26.21 | Aromatic 200ND | 3EO PhosE | 4.04 | 68.98 | 98.40 |
| B210 | 24.87 | Aromatic 200ND | 5EO PhosE | 3.96 | 78.59 | 101.06 |
| B212 | 21.03 | Aromatic 200ND | 3EO PhosE | 3.80 | 77.86 | 101.58 |

TABLE 18

Recovery of compounds (A) and 2,4-D in % after storage at 54° C. for 2 weeks

| Sample | % ae | | | | % Recovery | |
|---|---|---|---|---|---|---|
| ID | 2,4-D | Solvent | Surfactant | pH | Cmp. A | 2,4-D |
| B213 | 25.76 | Aromatic 200ND | 3EO PhosE | 3.83 | 76.74 | 100.47 |
| B214 | 20.48 | Aromatic 200ND | 5EO PhosE | 3.89 | 78.40 | 101.71 |
| B215 | 20.01 | Aromatic 200ND | 5EO PhosE | 3.84 | 80.85 | 101.00 |
| B216 | 24.50 | Acetophenone | 5EO PhosE | 4.90 | 84.04 | 101.63 |
| B217 | 25.06 | Aromatic 200ND | 5EO PhosE | 4.51 | 80.69 | 101.25 |
| B218 | 25.76 | Aromatic 200ND | 5EO PhosE | 3.83 | 69.48 | 94.61 |
| B219 | 25.08 | Aromatic 200ND | 5EO PhosE | 3.93 | 75.34 | 100.35 |
| B220 | 25.08 | Aromatic 200ND | 5EO PhosE | 3.93 | 82.85 | 104.74 |
| B221 | 26.50 | Aromatic 200ND | 5EO PhosE | 3.98 | 78.93 | 100.87 |
| B222 | 23.63 | Aromatic 200ND | 5EO PhosE | 4.11 | 73.02 | 101.34 |
| B223 | 17.33 | Aromatic 200ND | 5EO PhosE | 4.18 | 71.64 | 111.01 |
| B224 | 21.97 | Aromatic 200ND | 5EO PhosE | 4.24 | 76.89 | 100.77 |
| B225 | 21.97 | Aromatic 200ND | 3EO PhosE | 4.27 | 75.27 | 102.41 |
| B226 | 22.83 | Aromatic 200ND | 3EO PhosE | 4.39 | 76.01 | 101.42 |
| B227 | 23.20 | Aromatic 200ND | 5EO PhosE | 4.69 | 79.67 | 101.72 |
| B228 | 23.68 | Aromatic 200ND | 5EO PhosE | 5.23 | 83.86 | 102.66 |
| B229 | 23.84 | Aromatic 200ND | 5EO PhosE | 4.40 | 86.49 | 99.36 |
| B230 | 23.15 | Aromatic 200ND | 5EO PhosE | 4.71 | 84.76 | 103.27 |
| B231 | 22.17 | Aromatic 200ND | 5EO PhosE | 5.02 | 84.42 | 102.94 |

TABLE 19

Recovery of compounds (A) and 2,4-D in % after storage at 54° C. for 2 weeks

| Sample | % ae | | | | % Recovery | |
|---|---|---|---|---|---|---|
| ID | 2,4-D | Solvent | Surfactant | pH | Cmp. A | 2,4-D |
| B232 | 22.01 | Aromatic 200ND | 5EO PhosE | 5.30 | 81.58 | 100.67 |

TABLE 19-continued

Recovery of compounds (A) and 2,4-D in % after storage at 54° C. for 2 weeks

| Sample ID | % ae 2,4-D | Solvent | Surfactant | pH | % Recovery Cmp. A | % Recovery 2,4-D |
|---|---|---|---|---|---|---|
| B233 | 22.96 | Aromatic 200ND | 5EO PhosE | 5.02 | 84.44 | 103.17 |
| B234 | 25.60 | Acetophenone | 5EO PhosE | 7.30 | 42.16 | 99.51 |
| B235 | 25.69 | Acetophenone | 5EO PhosE | 6.23 | 76.43 | 103.39 |
| B236 | 20.22 | Aromatic 200ND | 3EO PhosE | 6.94 | 60.62 | 103.20 |
| B237 | 17.54 | Acetophenone | 3EO PhosE | 5.08 | 87.57 | 102.27 |
| B238 | 22.96 | Aromatic 200ND | 5EO PhosE | 5.02 | 98.62 | 103.12 |
| B241 | 16.76 | Aromatic 200ND | 5EO PhosE | 4.50 | 89.80 | 102.21 |
| B242 | 16.43 | Aromatic 200ND | 5EO PhosE | 4.50 | 87.36 | 102.16 |
| B245 | 14.87 | Aromatic 200ND | 5EO PhosE | 4.38 | 89.35 | 100.71 |
| B246 | 14.62 | Acetophenone | 3EO PhosE | 4.56 | 87.22 | 101.97 |
| B252 | 14.00 | Aromatic 200ND | 5EO PhosE | 4.41 | 88.91 | 99.50 |
| B253 | 13.95 | Aromatic 200ND | 5EO PhosE | | 86.70 | 101.23 |
| B254 | 13.60 | Acetophenone | 5EO PhosE | 4.47 | 89.60 | 101.06 |
| B255 | 15.28 | Acetophenone | 5EO PhosE | 4.90 | 79.07 | 88.04 |
| B256 | 16.38 | Acetophenone | 5EO PhosE | 4.90 | 85.18 | 99.24 |
| B257 | 17.32 | Acetophenone | 5EO PhosE | 4.90 | 84.87 | 101.90 |
| B258 | 16.60 | Acetophenone | 5EO PhosE | 4.90 | 87.22 | 100.57 |
| B279 | 27.03 | Acetophenone | 5EO PhosE | 4.61 | 84.96 | 102.56 |
| B280 | 27.27 | Acetophenone | 5EO PhosE | 4.61 | 86.17 | 102.18 |
| B303 | 27.35 | Benzyl acetate | 5EO PhosE | 4.61 | 86.79 | 103.46 |
| B304 | 30.99 | Benzyl acetate | 5EO PhosE | 4.61 | 82.76 | 102.52 |

TABLE 20

Recovery of compounds (A) and 2,4-D in % after storage at 40° C. for 8 weeks

| Sample ID | % ae 2,4-D | Solvent | Surfactant | pH | % Recovery Cmp. A | % Recovery 2,4-D |
|---|---|---|---|---|---|---|
| B357 | 30.50% | Acetophenone | 5EO Phos E | 4.65 | 93.43 | 98.97 |
| B358 | 32.46% | Acetophenone | 5EO Phos E | 4.50 | 91.26 | 99.03 |
| B361 | 30.50% | Benzyl Acetate | 5EO Phos E | 4.58 | 94.64 | 98.46 |
| B362 | 32.46% | Benzyl Acetate | 5EO Phos E | 4.59 | 95.41 | 98.20 |

Greenhouse Trials

In greenhouse trials, the herbicidal (weed control) efficacy of some of the herbicidal compositions according to the present disclosure were assessed against three weed species.

*Amaranthus palmeri* (AMAPA, Palmer amaranth), *Amaranthus tamariscinus* (AMATA, waterhemp) and *Eleusine indica* (ELEIN, goosegrass) plants were grown in pots in the greenhouse under standard conditions until they reached the 4 to 6 inch growth stage. Applications were made at 140 1/ha with a TeeJet Turbo Induction TTI110015 nozzle.

All three weed species were resistant to glyphosate, the two *Amaranthus* species were additionally resistant to protoporphyrinogen oxidase (PPO) inhibitor herbicides.

Twenty-one days after application (21 DAA) the different weed species were visually rated on a percentage scale in relation to the untreated control (100%=all plants dead; 50%=green plant biomass reduced by 50%, and 0%=no discernible difference=like control plot). All trials were run with at least 24 replicates, in Table HE the average herbicidal efficacy across all replicates is shown.

TABLE HE

Herbicidal efficacy of formulations according to the present disclosure

| Sample ID | AMAPA | AMATA | ELEIN |
|---|---|---|---|
| B229 | 100.0% | 100.0% | 100.0% |
| B237 | 100.0% | 100.0% | 98.8% |
| B238 | 99.1% | 100.0% | 100.0% |
| B245 | 100.0% | 96.9% | 100.0% |
| B279 | 99.1% | 98.8% | 100.0% |
| B280 | 99.8% | 100.0% | 99.1% |

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9".

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A herbicide composition comprising compounds (A) and (B), wherein:

(A) denotes ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy] acetate (epyrifenacil); and (B) denotes the triethanolamine (TEA) salt of 2,4-D (2,4-dichlorophenoxyacetic acid), wherein the composition is in the form of an oil-in-water microemulsion, and the composition further comprises:

a phosphate ester dispersant; and one or more drift retardant agents selected from:

triglycerides of fatty acids with 12 to 24 carbon atoms;

esters of fatty oils, wherein the fatty oils are selected from the group consisting soybean oil, an ester of soybean oil, canola oil, an ester of canola oil, palm oil, an ester of palm oil, rapeseed oil, an ester of rapeseed oil, sunflower seed oil, an ester of sunflower seed oil, corn oil, an ester of corn oil, peanut oil, an ester of peanut oil, sesame oil, an ester of sesame oil, olive oil, an ester of olive oil, castor oil and a combination thereof;

polyacrylamides, polyethylene oxide, and guar gum.

2. The herbicide composition as claimed in claim 1, wherein the composition is liquid at 25° C. and 1013 mbar.

3. The herbicide composition as claimed in claim 1, wherein a ratio by weight of a total amount of compound (A) and a total amount of compound (B) is in a range of from about 1:10 to about 1:150.

4. The herbicide composition as claimed in claim 1, wherein the herbicide composition comprises compound (B) in a total amount of up to about 75 wt. %, based on a total weight of the herbicide composition; and/or wherein the herbicide composition comprises compound (A) in a total amount of up to about 2 wt. %, based on the total weight of the herbicide composition.

5. The herbicide composition as claimed in claim 1, further comprising one or more constituents selected from the group consisting of other herbicidal active compounds, herbicide safeners, formulation auxiliaries and additives customary in crop protection.

6. The herbicide composition as claimed in claim 1, further comprising a substantially water-immiscible organic solvent, wherein the substantially water-immiscible organic solvent is selected such that compound (A) has an organic solvent/water partition coefficient, expressed as a logarithm, of about 4 or greater.

7. The herbicide composition as claimed in claim 6, wherein a total amount of the water-immiscible organic solvent is in a range of about 2 wt. % to about 30 wt. %, based on a total weight of the composition.

8. The herbicide composition as claimed in claim 1, wherein the substantially water-immiscible organic solvent is selected from the group consisting of acetophenone, benzyl acetate, and aromatic hydrocarbons $C_{10}$-$C_{16}$, and mixtures thereof.

9. The herbicide composition as claimed in claim 1, further comprising one or more water-soluble stabilizing agents selected from the group of organic quaternary ammonium halides and chlorine containing vitamins, and mixtures thereof.

10. The herbicide composition as claimed in claim 1, further comprising one or more water-soluble organic stabilizing agents selected from the group consisting of vitamin B4 (choline chloride; (2-hydroxyethyl) trimethylammonium chloride; CAS number 67-48-1), vitamin B6 (pyridoxine hydrochloride; 4,5-bis (hydroxymethyl)-3-hydroxy-2-methylpyridine hydrochloride; 3-hydroxy-4,5-bis (hydroxymethyl)-2-methylpyridine hydrochloride; CAS number 58-56-0), benzalkonium chloride (N-alkyl-N-benzyl-N,N -dimethylammonium chloride; alkyldimethylbenzylammonium chloride; CAS number 8001-54-5), and mixtures thereof.

11. The herbicide composition as claimed in claim 1, further comprising one or more water-soluble stabilizing agents in a total amount of from about 1% to about 20% by weight, based on a total weight of the composition.

12. The herbicide composition as claimed in claim 1, wherein a pH-value of the composition, as diluted, is less than 7, when diluted with water such that a concentration of the triethanolamine salt of 2,4-D corresponds to 1.8% by weight calculated as 2,4-D acid and measured at 25° C. and 1013 mbar.

13. The herbicide composition as claimed in claim 1, further comprising the one or more drift retardant agents in a total amount in a range of about 1 wt. % to about 10 wt. %, based on a total weight of the composition.

14. The herbicide composition as claimed in claim 1, wherein the herbicide composition does not contain sodium or potassium ions in an amount that results in precipitation of the sodium or potassium salt of 2,4-dichlorophenoxyacetic acid in the herbicide composition or a dilution with water thereof.

15. The herbicide composition as claimed in claim 1, wherein the herbicide composition is free of the monoethanolamine salt of dicamba.

16. The herbicide composition as claimed in claim 1, wherein a ratio by weight of a total amount of compound (A) and a total amount of compound (B) is in a range of from about 1:10 to about 1:150.

17. The herbicide composition as claimed in claim 1, wherein the herbicide composition comprises compound (B) in a total amount of up to about 75 wt. %, based on a total weight of the herbicide composition; and wherein the herbicide composition comprises compound (A) in a total amount of up to about 2 wt. %, based on the total weight of the herbicide composition.

18. The herbicide composition as claimed in claim 1, further comprising a substantially water-immiscible organic solvent, wherein the substantially water-immiscible organic solvent is selected such that compound (A) has an organic solvent/water partition coefficient, expressed as a logarithm, of about 4 or greater.

19. The herbicide composition as claimed in claim 18, wherein a total amount of the water-immiscible organic solvent is in a range of about 2 wt. % to about 30 wt. %, based on a total weight of the composition.

20. The herbicide composition as claimed in claim 18, wherein the substantially water-immiscible organic solvent is selected from the group consisting of acetophenone, benzyl acetate, and aromatic hydrocarbons $C_{10}$-$C_{16}$, and mixtures thereof.

21. The herbicide composition as claimed in claim 1, further comprising one or more water-soluble stabilizing agents in a total amount of from about 1% to about 20% by weight, based on a total weight of the composition.

22. The herbicide composition as claimed in claim 1, wherein a pH-value of the composition, as diluted, is less than 7, when diluted with water such that a concentration of the triethanolamine salt of 2,4-D corresponds to 1.8% by weight calculated as 2,4-D acid and measured at 25° C. and 1013 mbar.

23. The herbicide composition as claimed in claim 1 comprising the one or more drift retardant agents in a total amount in a range of about 2 wt. % to about 8 wt. %, based on a total weight of the composition.

24. A method for controlling undesired growth of plants, comprising applying the herbicide composition as defined in claim 1 onto the plants, parts of the plants, plant seeds or area where the plants grow.

25. A method of manufacturing the herbicide composition defined in claim 1, comprising the following steps:

(i) providing water and compound (B);

(ii) providing compound (A) dissolved in one or more organic solvents, wherein at least one of said organic solvents is not fully miscible with water and wherein compound (A) has a solubility of 5 wt. % or greater in at least one of said organic solvents, measured at 25° C. and 1013 mbar;

(iii) providing the phosphate ester dispersant, and optionally one or more stabilizing agents and the one or more drift retardant agents; and mixing the constituents provided in steps (i), (ii) and (iii).

26. A method of manufacturing a herbicide composition comprising compounds (A) and (B), wherein (A) denotes ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate (epyrifenacil) and wherein (B) denotes the triethanolamine (TEA) salt of 2,4-D (2,4-dichlorophenoxyacetic acid), the method comprising:

(i) providing water and compound (B);

(ii) providing compound (A) dissolved in one or more organic solvents, wherein at least one of said organic solvents is not fully miscible with water and wherein compound (A) has a solubility of 5 wt. % or greater-in at least one of said organic solvents, measured at 25° C. and 1013 mbar;

(iii) providing a phosphate ester dispersant, and optionally one or more stabilizing agents and one or more drift retardant agents; and mixing the constituents provided in steps (i), (ii) and (iii), wherein the one or more drift retardant agents triglycerides of fatty acids with 12 to 24 carbon atoms;

esters of fatty oils, wherein the fatty oils are selected from the group consisting soybean oil, an ester of soybean oil, canola oil, an ester of canola oil, palm oil, an ester of palm oil, rapeseed oil, an ester of rapeseed oil, sunflower seed oil, an ester of sunflower seed oil, corn oil, an ester of corn oil, peanut oil, an ester of peanut oil, sesame oil, an ester of sesame oil, olive oil, an ester of olive oil, castor oil and a combination thereof;

polyacrylamides, polyethylene oxide, and guar gum.

27. The herbicide composition as claimed in claim 1, further comprising one or more water-soluble organic stabilizing agents selected from the group of organic quaternary ammonium chlorides.

* * * * *